United States Patent
Yamamori et al.

(10) Patent No.: US 7,450,594 B2
(45) Date of Patent: Nov. 11, 2008

(54) MESSAGE WRITING APPARATUS, MESSAGE WRITING METHOD, MESSAGE READOUT APPARATUS, MESSAGE READOUT METHOD, MEMORY ADDRESS CONTROL CIRCUIT FOR WRITING OF VARIABLE-LENGTH MESSAGE AND MEMORY ADDRESS CONTROL CIRCUIT FOR READOUT OF VARIABLE-LENGTH MESSAGE

(75) Inventors: Akira Yamamori, Yokohama (JP); Takeshi Sasaki, Yokohama (JP); Eiji Maeda, Yokohama (JP); Masao Maeda, Yokohama (JP); Tatsuya Oku, Yokohama (JP); Yoshinori Okuda, Yokohama (JP); Tsuguo Okada, Yokohama (JP); Akihiro Yasuo, Kawasaki (JP); Jinichi Yoshizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1262 days.

(21) Appl. No.: 10/042,441

(22) Filed: Nov. 9, 2001

(65) Prior Publication Data

US 2002/0057697 A1 May 16, 2002

Related U.S. Application Data

(63) Continuation of application No. PCT/JP99/02826, filed on May 28, 1999.

(51) Int. Cl.
*H04L 12/56* (2006.01)
(52) U.S. Cl. .................. 370/395.71; 370/412; 370/466
(58) Field of Classification Search ............ 370/395.65, 370/395.75, 395.71, 395.72, 412, 399, 466, 370/395.7
See application file for complete search history.

(56) References Cited

U.S. PATENT DOCUMENTS

| 5,144,619 A | * | 9/1992 | Munter ...................... 370/353 |
| 5,513,134 A | * | 4/1996 | Cooperman et al. ........... 365/49 |
| 5,521,915 A | * | 5/1996 | Dieudonne et al. ....... 370/395.3 |

(Continued)

FOREIGN PATENT DOCUMENTS

| CA | 2297324 | 2/1999 |
| DE | 19732171 | 1/1999 |
| EP | 0 884 922 A2 | 12/1998 |
| EP | 0884922 | 12/1998 |

(Continued)

OTHER PUBLICATIONS

Supplementary European Search Report and Annex to the European Search Report dated Jan. 24, 2008 for corresponding European Application 99 92 2543.
Notice of Reasons for Rejection dated Jun. 24, 2008, for corresponding Japanese Patent Application JP 2001-500496.

(Continued)

*Primary Examiner*—Min Jung
*Assistant Examiner*—Blount
(74) *Attorney, Agent, or Firm*—Katten Muchin Rosenman LLP

(57) ABSTRACT

In multi-connections, a message writing apparatus is provided. This message writing apparatus (21) comprises a path recognizing section (21*a*), a received message assembling section (21*b*), a receive control section (21*c*), an arbitrating section (21*d*) and an external memory control section (21*e*). When a received ATM cell is written/readout in/from a receiving buffer, it is written/read out in a memory area corresponding to each path, which enables the processing of AAL5 messages from a plurality of paths and improves the transfer processing capability, thereby leading to realizing a shortening of the data transfer time.

15 Claims, 27 Drawing Sheets

U.S. PATENT DOCUMENTS

| | | | |
|---|---|---|---|
| 5,649,217 A * | 7/1997 | Yamanaka et al. | 710/52 |
| 5,742,600 A * | 4/1998 | Nishihara | 370/395.6 |
| 5,848,067 A * | 12/1998 | Osawa et al. | 370/395.61 |
| 5,896,380 A * | 4/1999 | Brown et al. | 370/388 |
| 6,021,130 A * | 2/2000 | Kozaki et al. | 370/399 |
| 6,055,234 A * | 4/2000 | Aramaki | 370/395.72 |
| 6,529,519 B1 * | 3/2003 | Steiner et al. | 370/412 |
| 6,711,168 B1 * | 3/2004 | Yoshizawa et al. | 370/395.1 |
| 2002/0101871 A1 * | 8/2002 | Takase et al. | 370/390 |

FOREIGN PATENT DOCUMENTS

| | | |
|---|---|---|
| JP | 3101340 | 4/1991 |
| JP | 03-239037 | 10/1991 |
| JP | 5035624 | 2/1993 |
| JP | 10-341238 | 12/1998 |

* cited by examiner

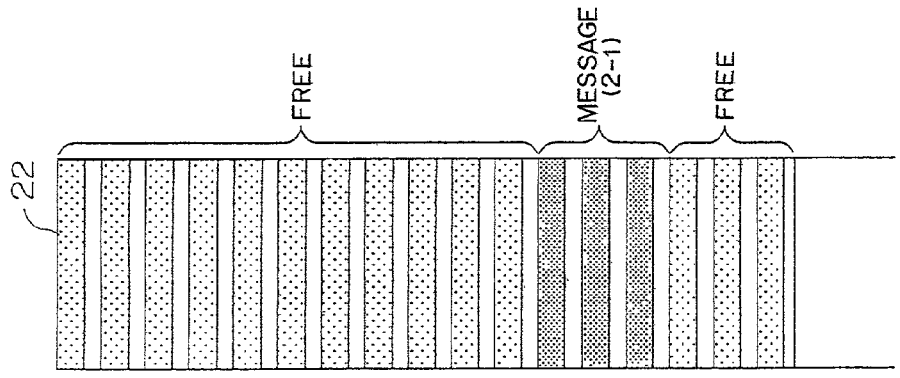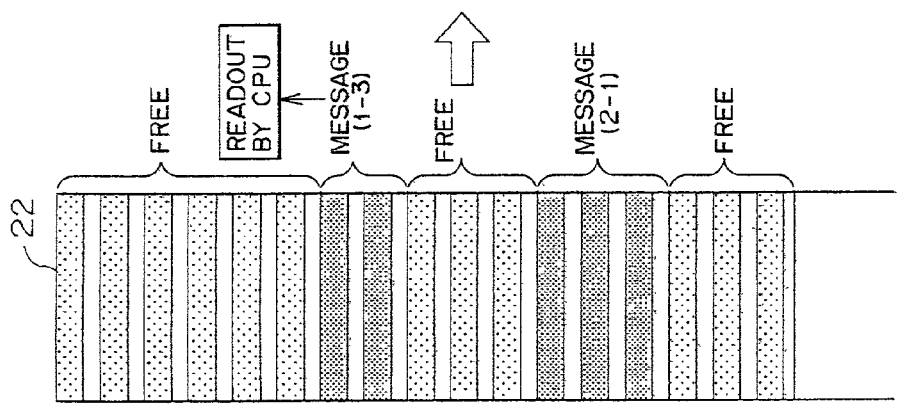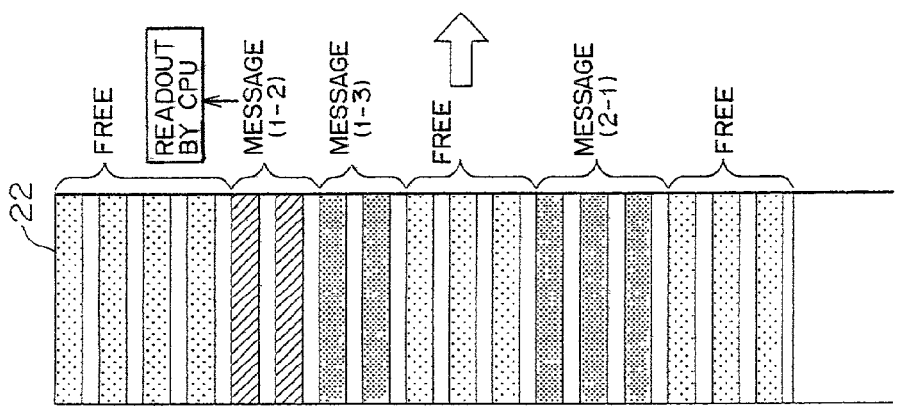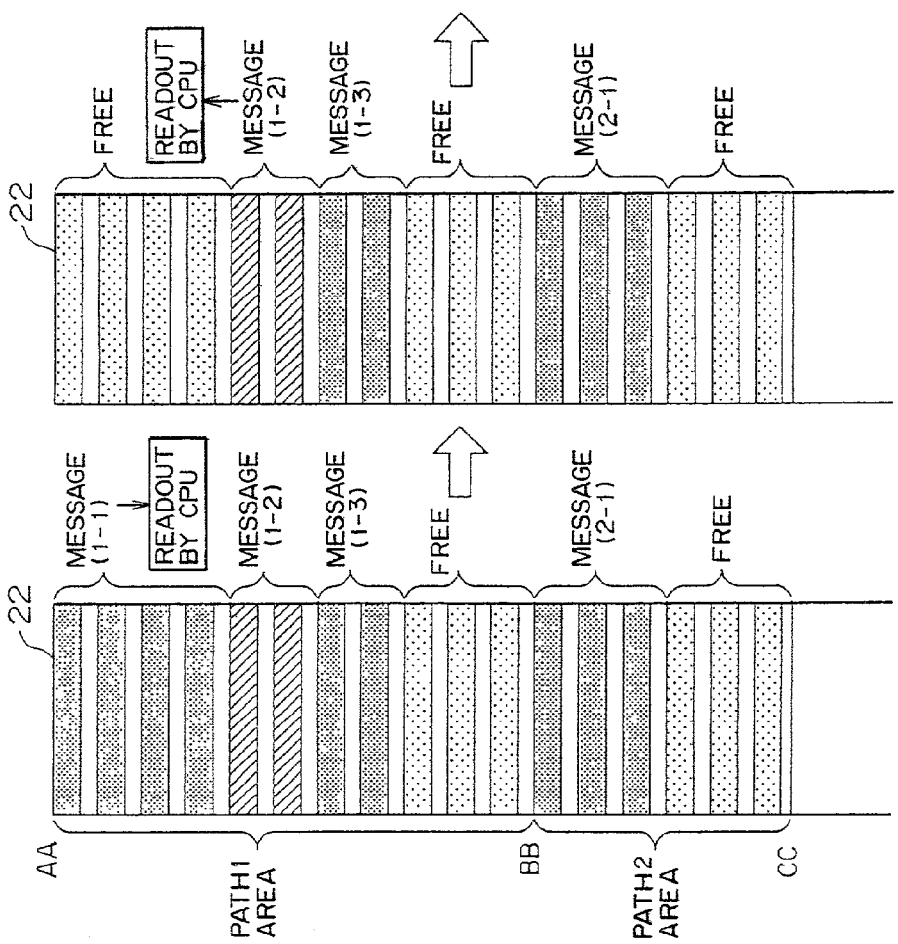

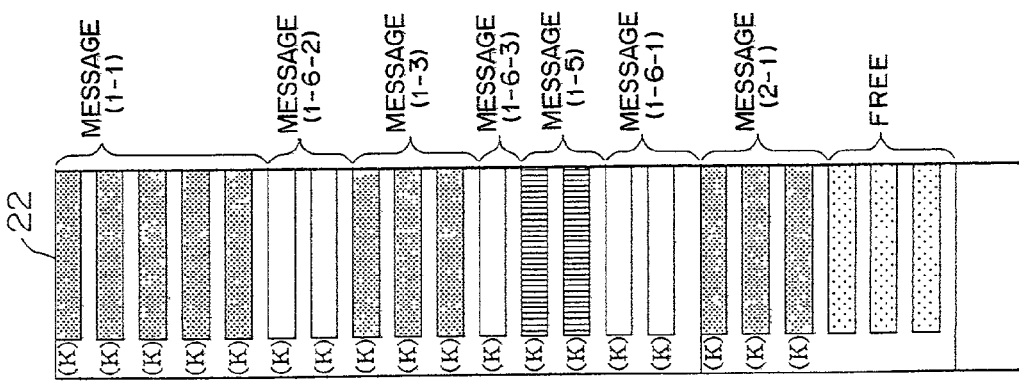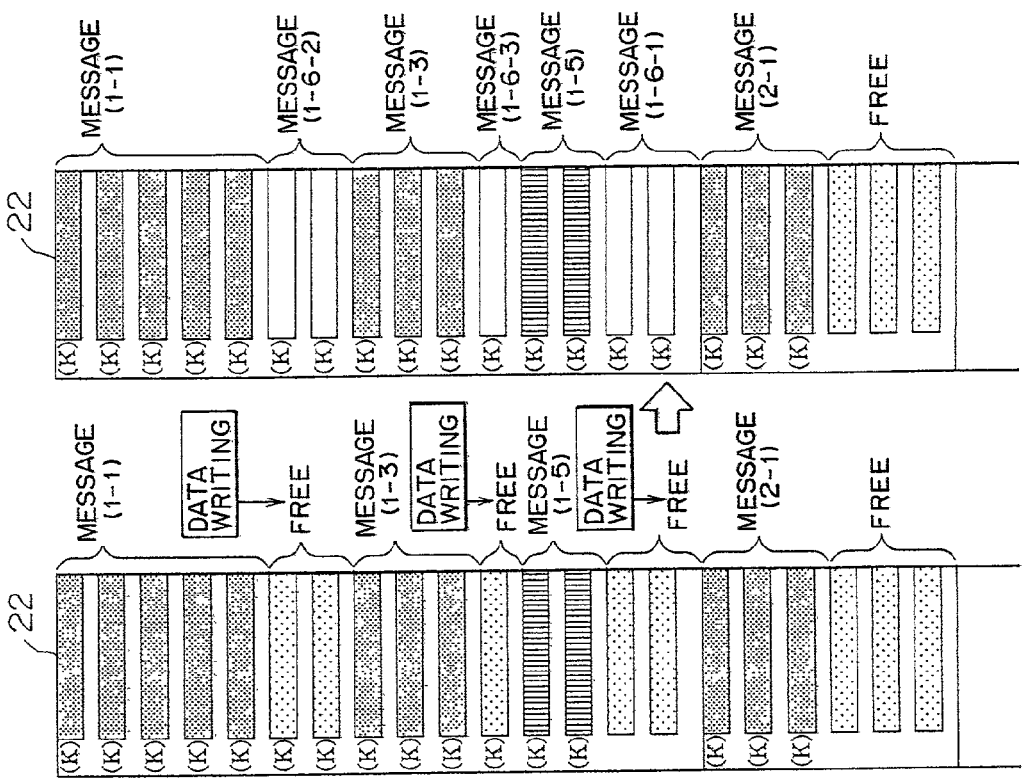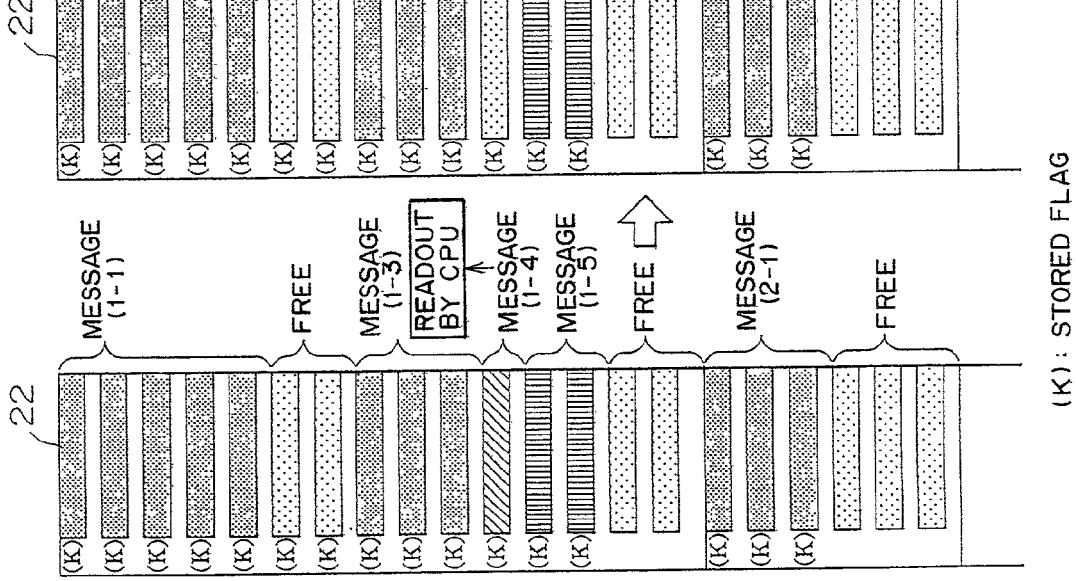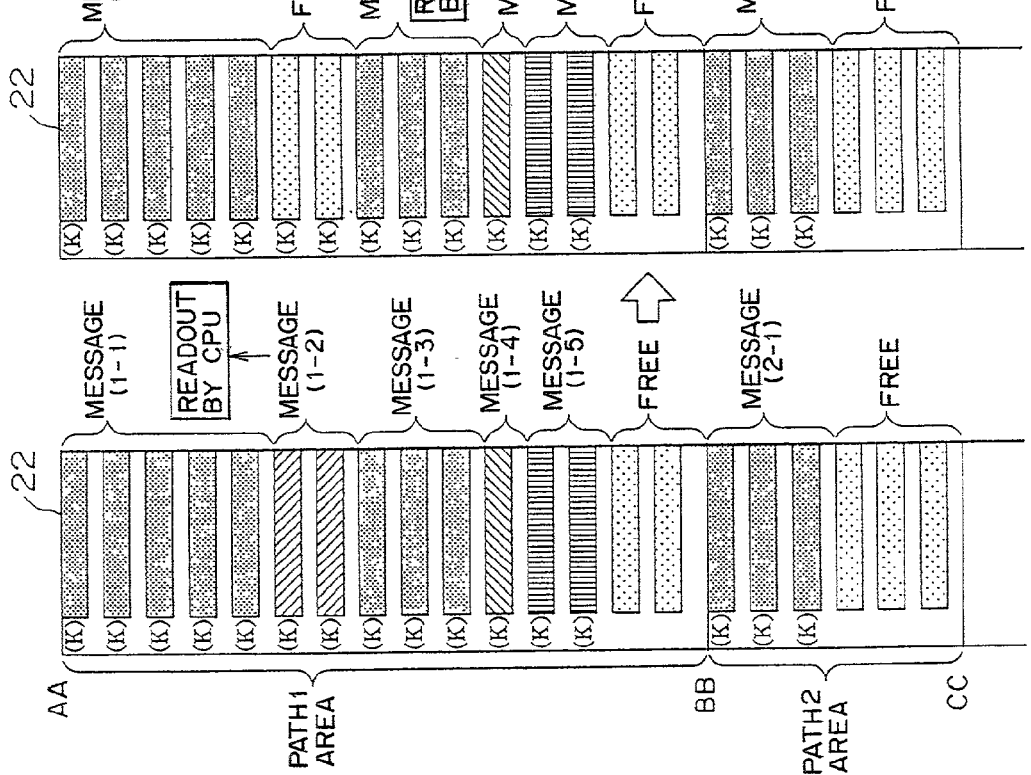

| 0000 | 0030 | 0060 | 0090 | 00C0 | 00F0 | 0120 | 0150 |
|---|---|---|---|---|---|---|---|
| 1-1 CELL | 1-2 CELL | 1-3 CELL | 2-1 CELL | 2-2 CELL | 2-3 CELL | 2-4 CELL | |

FIG.12(b)

| 0000 | 0030 | 0060 | 0090 | 00C0 | 00F0 | 0120 | 0150 | 0180 |
|---|---|---|---|---|---|---|---|---|
| 1-1 CELL | 1-2 CELL | 1-3 CELL | 2-1 CELL | 2-2 CELL | 2-3 CELL | 2-4 CELL | 2-5 CELL | |

FIG.12(c)

| 0000 | 0030 | 0060 | 0090 | 00C0 | 00F0 | 0120 | 0150 | 0180 | 01B0 |
|---|---|---|---|---|---|---|---|---|---|
| 1-1 CELL | 1-2 CELL | 1-3 CELL | 2-1 CELL | 2-2 CELL | 2-3 CELL | 2-4 CELL | 2-5 CELL | | 2-6 CELL |

FIG.12(d)

| 0000 | 0030 | 0060 | 0090 | 00C0 | 00F0 | 0120 | 0150 | 0180 | 01B0 |
|---|---|---|---|---|---|---|---|---|---|
| 1-1 CELL | 1-2 CELL | 1-3 CELL | 2-1 CELL | 2-2 CELL | 2-3 CELL | 2-4 CELL | 2-5 CELL | 2-6 CELL | 3-1 CELL |

FIG.12(e)

| 0000 | 0030 | 0060 | 0090 | 00C0 | 00F0 | 0120 | 0150 | 0180 | 01B0 |
|---|---|---|---|---|---|---|---|---|---|
| 1-1 CELL | 1-2 CELL | 1-3 CELL | 2-1 CELL | 2-2 CELL | 2-3 CELL | 2-4 CELL | 2-5 CELL | 2-6 CELL | 3-1 CELL |

FIG.12(f)

| 0000 | 0030 | 0060 | 0090 | 00C0 | 00F0 | 0120 | 0150 | 0180 | 01B0 |
|---|---|---|---|---|---|---|---|---|---|
| 1-1 CELL | 1-2 CELL | 1-3 CELL | 2-1 CELL | 2-2 CELL | 2-3 CELL | 2-4 CELL | 2-5 CELL | 2-6 CELL | 3-1 CELL |

FIG.13(a) FIG.13(b) FIG.13(c) FIG.13(d) FIG.13(e) FIG.13(f)

| Address | (a) | (b) | (c) | (d) | (e) | (f) |
|---|---|---|---|---|---|---|
| 0000 | 1-1 CELL | 1-1 CELL | 1-1 CELL | 1-1 CELL | 1-1 CELL (RELEASED) | 1-1 CELL (RELEASED) |
| 0030 | 1-2 CELL | 1-2 CELL | 1-2 CELL | 1-2 CELL | 1-2 CELL (RELEASED) | 1-2 CELL (RELEASED) |
| 0060 | 1-3 CELL | 1-3 CELL | 1-3 CELL | 1-3 CELL | 1-3 CELL (RELEASED) | 1-3 CELL (RELEASED) |
| 0090 | 2-1 CELL | 2-1 CELL | 2-1 CELL | 2-1 CELL | 2-1 CELL | 2-1 CELL |
| 00C0 | 2-2 CELL | 2-2 CELL | 2-2 CELL | 2-2 CELL | 2-2 CELL | 2-2 CELL |
| 00F0 | 2-3 CELL | 2-3 CELL | 2-3 CELL | 2-3 CELL | 2-3 CELL | 2-3 CELL |
| 0120 | 2-4 CELL | 2-4 CELL | 2-4 CELL | 2-4 CELL | 2-4 CELL | 2-4 CELL |
| 0150 | 2-5 CELL | 2-5 CELL | 2-5 CELL | 2-5 CELL | 2-5 CELL | 2-5 CELL |
| 0180 | 2-6 CELL | 2-6 CELL | 2-6 CELL | 2-6 CELL | 2-6 CELL | 2-6 CELL |
| 01B0 | 4-1 CELL | 4-1 CELL | 4-1 CELL | 4-1 CELL | 4-1 CELL | 4-1 CELL |
| 01E0 | | | | | | |
| 0210 | | | | | | |
| 0240 | | | | | | |
| 0270 | | | | | | |
| 02A0 | | | | | | |
| 02D0 | | | | | | |
| 0300 | | | | | | |
| 0330 | | | | | | |
| 0360 | | | | | | |
| 0390 | | | | | | |

FIG.14(a) FIG.14(b) FIG.14(c) FIG.14(d) FIG.14(e) FIG.14(f)

| Address | (a) | (b) | (c) | (d) | (e) | (f) |
|---|---|---|---|---|---|---|
| 0000 | 6-1 CELL | 6-1 CELL | 6-1 CELL | 6-1 CELL | 6-1 CELL | 6-1 CELL |
| 0030 | 1-2 CELL(RELEASED) | 6-2 CELL | 6-2 CELL | 6-2 CELL | 6-2 CELL | 6-2 CELL |
| 0060 | 1-3 CELL(RELEASED) | 1-3 CELL(RELEASED) | 6-3 CELL | 6-3 CELL | 6-3 CELL | 6-3 CELL |
| 0090 | 2-1 CELL | 2-1 CELL | 2-1 CELL | 2-1 CELL(RELEASED) | 6-4 CELL | 6-4 CELL |
| 00C0 | 2-2 CELL | 2-2 CELL | 2-2 CELL | 2-2 CELL(RELEASED) | 2-2 CELL(RELEASED) | 6-5 CELL |
| 00F0 | 2-3 CELL | 2-3 CELL | 2-3 CELL | 2-3 CELL(RELEASED) | 2-3 CELL(RELEASED) | 2-3 CELL(RELEASED) |
| 0120 | 2-4 CELL | 2-4 CELL | 2-4 CELL | 2-4 CELL(RELEASED) | 2-4 CELL(RELEASED) | 2-4 CELL(RELEASED) |
| 0150 | 2-5 CELL | 2-5 CELL | 2-5 CELL | 2-5 CELL(RELEASED) | 2-5 CELL(RELEASED) | 2-5 CELL(RELEASED) |
| 0180 | 2-6 CELL | 2-6 CELL | 2-6 CELL | 2-6 CELL(RELEASED) | 2-6 CELL(RELEASED) | 2-6 CELL(RELEASED) |
| 01B0 | 4-1 CELL | 4-1 CELL | 4-1 CELL | 4-1 CELL | 4-1 CELL | 4-1 CELL |
| 01E0 | | | | | | |
| 0210 | | | | | | |
| 0240 | | | | | | |
| 0270 | | | | | | |
| 02A0 | | | | | | |
| 02D0 | | | | | | |
| 0300 | | | | | | |
| 0330 | | | | | | |
| 0360 | | | | | | |
| 0390 | | | | | | |

22

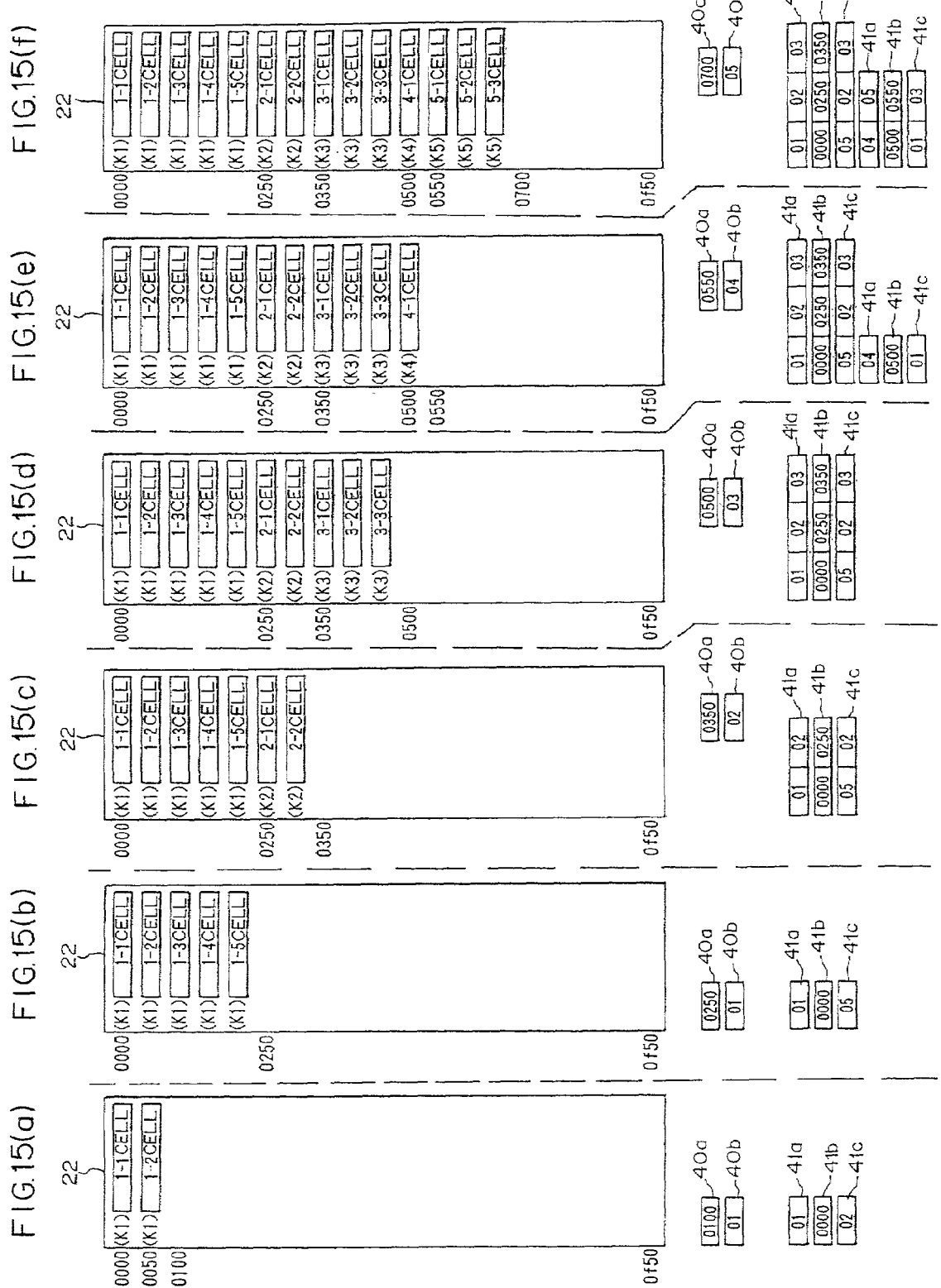

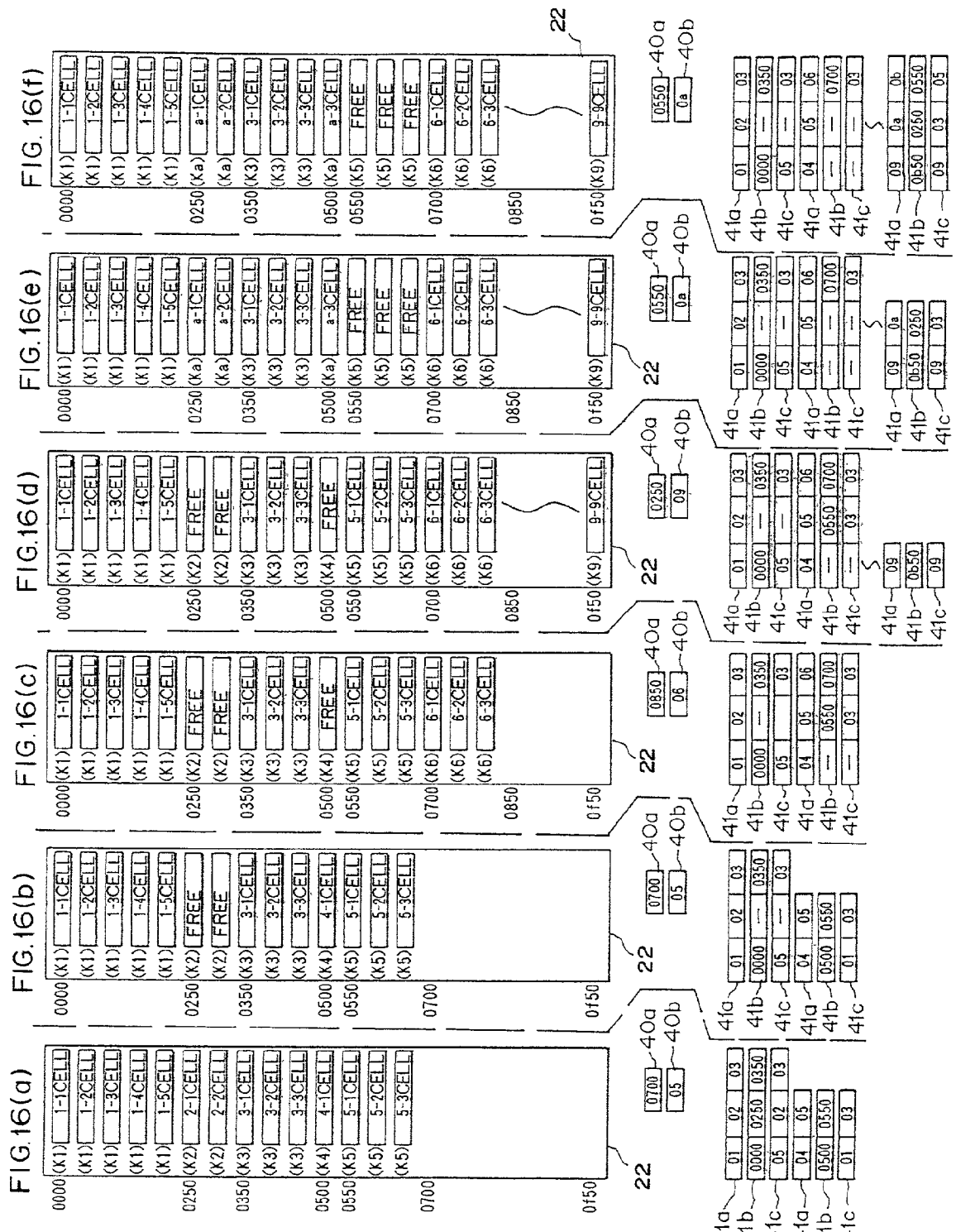

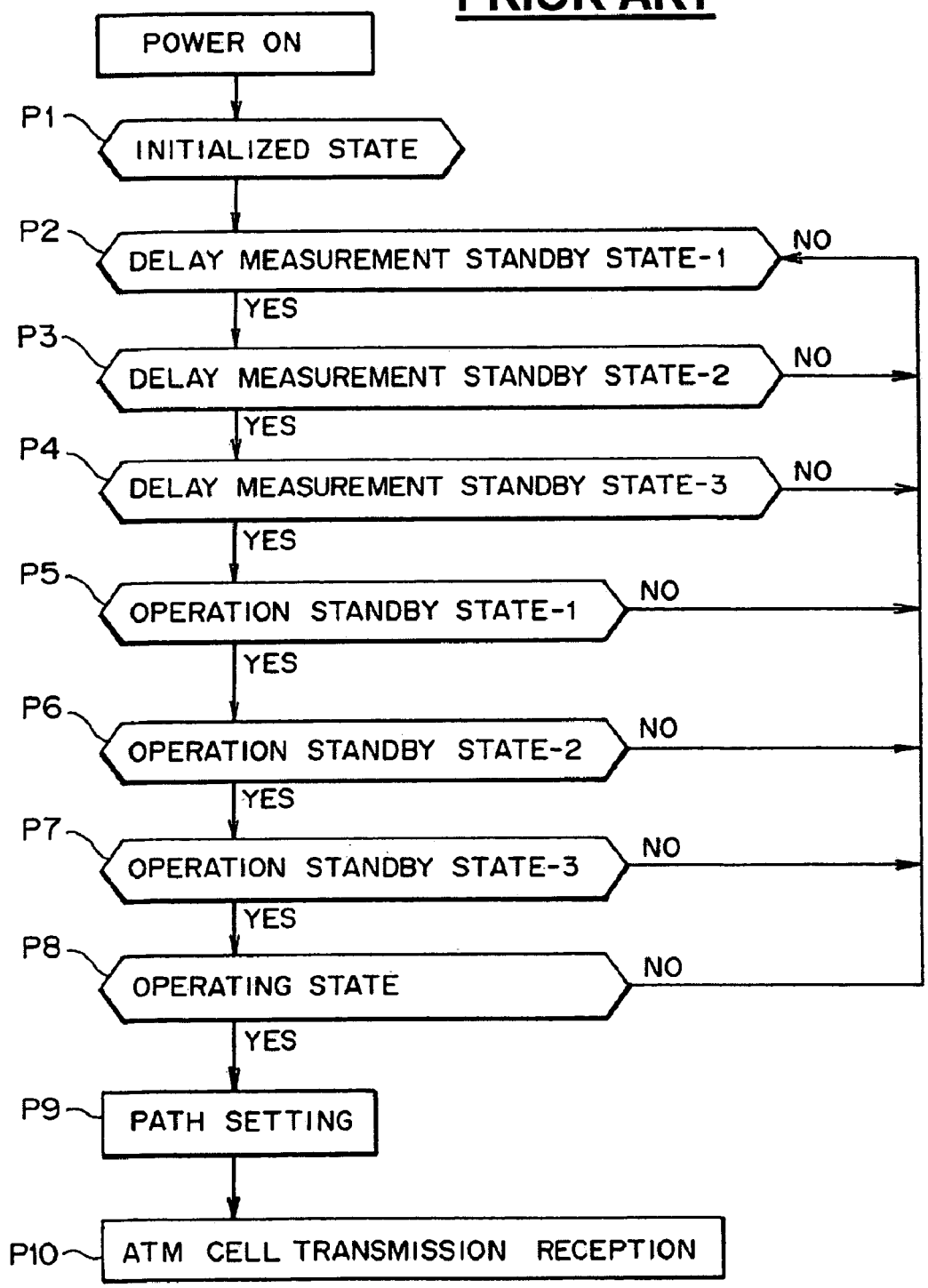

MESSAGE WRITING APPARATUS, MESSAGE WRITING METHOD, MESSAGE READOUT APPARATUS, MESSAGE READOUT METHOD, MEMORY ADDRESS CONTROL CIRCUIT FOR WRITING OF VARIABLE-LENGTH MESSAGE AND MEMORY ADDRESS CONTROL CIRCUIT FOR READOUT OF VARIABLE-LENGTH MESSAGE

This application is a continuation of international application Ser. No. PCTJP99/02826, filed May 28, 1999.

TECHNICAL FIELD

The present invention relates to a message writing apparatus, a message writing method, a message readout apparatus, a message readout method, a memory address control circuit for writing of a variable-length message and a memory address control circuit for readout of a variable-length message, which are suitable for use in transmission/reception of an AAL5 message.

BACKGROUND ART

In the recent years, an ATM-PON (Asynchronous Transfer Mode-Passive Optical Network) system has been employed for efficient communications using an ATM (Asynchronous Transfer Mode) network. FIG. 21 is an illustration of a configuration of the ATM-PON system. An ATM-PON system shown in FIG. 21 is of a type, for example, providing a telephone service or video service, and is made up of an ONU (Optical Network Unit) group 70, an ODN (Optical Distribution Network) 71, an ATM-optical subscriber line terminating unit 75, an SDH trunk-system multiplexer 76, a router 74, a DCN (Digital Connection Network) 73 and an OPS (Operation System) 72.

In this configuration, the ONU group 70 includes a plurality of ONUs, for example, 64 ONUs #1 to #64 as shown in FIG. 21. These ONUs are connected to homes to accommodate the ordinary users. Moreover, each of the ONUs interchanges serial numbers or identification information with the ODN 71 to allow the ODN 71 to identify terminal names. A sequence therefor will be described later with reference to FIG. 27.

In addition, the ODN 71 is for time-division-multiplexing ATM-PON cells in a direction from the ONU group 70 to the ATM-optical subscriber line terminating unit 75 and for branching ATM-PON cells in a direction from the ATM-optical subscriber line terminating unit 75 to the ONU group 70.

The ATM-optical subscriber line terminating unit 75 is for establishing an interface between optical subscribers on the ONU group 70 side and an ATM network on the SDH trunk-system (backbone) multiplexer 76 side, and further for controlling transmissions.

FIG. 22(a) is an illustration of a configuration of a 150-Mbps down stream frame, and FIG. 22(b) is an illustration of a configuration of a 150-Mbps up stream frame. The down stream frame shown in FIG. 22(a) is a frame to be transmitted in a direction from the ATM-optical subscriber line terminating unit 75 to the ODN 71, while the up stream frame shown in FIG. 22(b) is a frame to be transmitted in a direction from the ODN 71 to the ATM-optical subscriber line terminating unit 75.

In FIG. 22(a), PLOAMs #1 and #2 included in the down stream frame are performance monitoring cells, while ATM Cell #1 to ATM Cell #54 included therein are user cells. These performance monitoring cells are cells for monitoring transmission lines, and are automatically sent whenever the transmission side transmits 27 user cells.

Concretely, The PLOAM #1 includes information on a path connection-accepting side, or others. An ATM header indicated by circled numeral 1 is a header section of an ATM cell transmitted, an IDEN indicated by circled numeral 2 is for identifying the head of a PLOAM cell, and a SYNC indicated by circled numeral 3 holds a count value written for timing generation. Moreover, GRANT 1 to 27 indicated by circled numeral 4 contains transmission grant information on an up-transmission line with respect to each ONU. The grant contents are seven in number. Still moreover, a message•PON-ID indicated by circled numeral 5 signifies a destination ID on the message transmitting side, a message•ID indicated by circled numeral 6 signifies a message•type identifier, and a message• field indicated by circled numeral 7 is for displaying message contents. Yet moreover, a BIP indicated by circled numeral 8 signifies a code for calculation of a bit error rate of ATM cells before the PLOAM cell.

Furthermore, the up stream frame shown in FIG. 22(b) is a time-division-multiplexed frame comprising user cells ATM Cell #1 to ATM Cell #53. Bits (screened) additionally placed before each of the ATM Cells represent three-byte overhead, which is for controlling the contents in accordance with a message in a down-PLOAM cell.

In addition, in FIG. 21, the SDH trunk-system multiplexer 76 is for transmitting main signal data through the use of ATM cells, the router 74 serves as a station at transmission of the main signal data, and the DCN 73 denotes a digital network. Still additionally, the OPS 72 is for remotely implementing centralized control of the ONU group 70 or the ATM-optical subscriber line terminating unit 75.

Still furthermore, in FIG. 21, coarse dotted lines depict control paths (control connections) between the ATM-optical subscriber line terminating unit 75 and the ONU group 70, while a fine dotted line depicts a main signal data path (main signal connection) between the ATM-optical subscriber line terminating unit 75 and the ONU group 70.

These paths establish multi-connection. For example, main signal data from the ONU group 70 existing in a city A pass through the main signal data path and are time-division-multiplexed in the ODN 71, and then are transmitted through the ATM-optical subscriber line terminating unit 75 to the SDH trunk-system multiplexer 76 existing in a city B. In addition, control signals from the ONU group 70 pass through the control paths and are time-division-multiplexed in the ODN 71 and then inputted to the ATM-optical subscriber line terminating unit 75, but not transmitted from this ATM-optical subscriber line terminating unit 75 to the external.

Moreover, in the ATM-optical subscriber line terminating unit 75 shown in FIG. 21, a PON-IF section 75d on the ODN 71 side is for performing format conversion between an ATM cell and an ATM-PON cell, an ATM-SW 75c is for switching main signal data, and an ATM-IF section 75e for making an interface for cell transmission between the ATM-optical subscriber line terminating unit 75 and the SDH trunk-system multiplexer 76.

Still moreover, a SEMF-IF section 75a connected to the router 74 side is for extracting a control command from a signal transmitted from an OPS 72 to send it to an OAM-IF section 80, and concretely, is for performing format conversion of a frame from the OPS 72.

Yet moreover, the OAM-IF section 80 is for receiving and assembling only one path for ATM cells inputted from the PON-IF section 75d to perform conversion to an adaptation layer AAL5 (ATM Adaptation Layer 5) message. Concretely, this OAM-IF section 80 assembles only one of a plurality of cells coming from the ONU group 70 through the use of a receiving buffer on the basis of a control command from the SEMF-IF section 75a and sends it out as an AAL5 message to the ATM-IF section 75e.

This AAL5 message signifies one of AAL0, AAL1, AAL3/4, AAL4 and AAL5 of an adaptation layer, different according to data type or data rate. As well known, the layer structure in the ATM communication comprises a physical layer, an ATM layer forming an upper layer of the physical layer for establishing connections in an ATM network to interchange ATM cells, and an ATM adaptation layer forming an upper layer of the ATM layer for translating information data and ATM cells. For example, with respect to a large volume of information data, ATM cells divided in units of 48 bytes are generated in the ATM adaptation layer and processed by the ATM layer and the physical layer. Moreover, this adaptation layer is classified into AAL0, AAL1, AAL3/4, AAL4 and AAL5 on the basis of information data types or information data rates.

Of these, the AAL5 is a layer for transmitting IP data or the like through an ATM network. In this AAL5, a variable-length pad (pseudo-data) is added to transmission data to form a multiple of 48 bytes and the pad-added data is CRC-operation-processed so that a parity is added to the variable-length pad added data. All the data thus obtained are outputted as CS-PDU which in turn, produces ATM cells divided into segments of 48 bytes, which can prevent bit errors or cell loss.

Thus, for example, ATM-PON cells passing through a plurality of paths from 64 ONUs #1 to #64 are time-division-multiplexed in the ODN 71 and converted into ATM cells in the PON-IF section 75d and further switching-processed in the ATM-SW 75c. These ATM cells are sent from the ATM-IF section 75e to the SDH trunk-system multiplexer 76. Moreover, the ATM cells sent from the SDH trunk-system multiplexer 76 are inputted through the ATM-IF section 75e to the OAM-IF section 80.

At this time, in this OAM-IF section 80, the receive assembling is made with respect to only one of a plurality of paths, thus conducting conversion into an AAL5 message. In addition, this AAL5 message is sent out from the SDH trunk-system multiplexer 76. In this connection, this path information indicates a path identified by the VPi (Virtual Path identifier) and VCi (Virtual Channel identifier) in an ATM cell header.

FIG. 23 is a block diagram showing a conventional OAM-IF section. In FIG. 23, an OAM-IF section 80 is composed of an ATM cell assembling unit 81 and an external memory (receiving buffer) 82. In this configuration, a path recognizing section 81a is for extracting path information from a received cell to abandon the received cell other than the path information on the receive assembling processing. A received message assembling section 81b is for conducting cell assembling on an AAL5 message having the path information on the assembling to output readout information, and an external memory control 81d is for controlling the readout from the external memory 82.

In this connection, in FIG. 21, in a case in which a timing at which the OAM-IF section 80 receives a command from the SEMF-IF section 75a and a timing at which message assembling processing is conducted in the external memory 82 differ time-wise from each other, an arbitrating section 81c mediates this time-wise difference, with it being controlled by a signal inputted from a CPU control section (not shown).

Secondly, a method of selecting one of received cells in the above-described configuration will be described herein below with reference to FIG. 24. FIG. 24 is a flowchart showing conventional received cell assembling processing. As FIG. 24 shows, upon reception of an ATM cell (step F1), a step F2 is implemented to extract path information from the received cell for checking whether or not it agrees with path information on receive assembling processing. If the agreement takes place, the YES route is taken for conducting cell assembling with respect to an AAL5 message having the assembling path information, and data on the received cell is written in the external memory 82 (step F3). On the other hand, if the checking result in the step F2 indicates no agreement, the NO route is taken for abandon the received cell other than that path information (step F4).

FIG. 25 is an illustrative view showing a flow from the ATM cell reception to the AAL5 message assembling. In FIG. 25, the received message assembling section 81b conducts the AAL5 message assembling with respect to an ATM cell transmitted through a path 1. Incidentally, this path information (for example, information indicative of path 1) is set on both transmission and reception.

FIG. 26 is an illustrative view showing a flow to be taken for when, upon the reception of an ATM cell, the received cell is abandoned. In FIG. 26, the received message assembling section 81b conducts the AAL5 message assembling with respect to the path 1. Moreover, when ATM cells 82a, 82b and 82c transmitted through the path 1 and ATM cells 83a and 83b transmitted through a path 2 are inputted to this received message assembling section 81b, the ATM cells 82a, 82b and 82c from the path 1 undergo the AAL5 message assembling in the external memory 82. On the other hand, the ATM cells 83a and 83b from the path 2 other than the set path, which have come in, are not subjected to the AAL5 message assembling on the path 2, but are abandoned.

A description will be added of the above-mentioned ONU. FIG. 27 is an illustration of a start-up sequence of the ONU. As FIG. 27 shows, in response to the power-on, the ONU takes an initial state (step P1), and upon the establishment the synchronization with the ODN 71, it enters a delay measurement standby state −1 (step P2). Then, after the setting of parameters, it falls into a delay measurement standby state −2 (step P3). When serial numbers are interchanged with respect to the PON-IF section 75d and the serial numbers are identical to each other, the YES route is taken so that it becomes a delay measurement standby state −3 (step P4).

Following this, examination is made on an optical laser output. If the examination shows a satisfactory result, the YES route is taken so that it falls in an operation standby state −1 (step P5). At this time, the serial numbers are again interchanged with respect to the PON-IF section 75d and an identification number is communicated thereto, and it enters an operation standby state −2 (step P6). Moreover, identification numbers for identifying a plurality of ONUs are added to the PON-IF section 75d and it enters an operation standby state −3 (step P7). In response to a notice on a delay adjustment indication value, the YES route is taken so that it takes an operating state (step P8). Furthermore, the setting of a path takes place (step P9) to perform interchange of ATM cells (step P10). In the steps P3 to P8, if there is no reception of a signal for state transition, the NO route takes place so that the flow returns to the step P2 processing.

As described above, this ATM-PON system 90 supports only a function to assemble only the AAL5 message having path information previously set for both transmission and reception. Accordingly, when an AAL5 message is received through a path other than the set path, there is no choice other than to abandon it. This creates a problem in that difficulty is encountered in achieving large volume transmission/reception. In addition, in assembling an AAL5 message from the path 2, there is a need to switch the path setting, and if a plurality of paths exist, there is a need to alter the setting on each of the paths so that transfer processing takes much time.

The present invention has been developed with a view to eliminating such problems, and it is therefore an object of the invention to provide a message writing apparatus, message writing method, message readout apparatus, message readout method, memory address control circuit for writing of a variable-length message and memory address control circuit for readout of a variable-length message, operable of, in the case of multi-connections, processing AAL5 messages from a plurality of paths by, when received ATM cells are read/written from/in a receiving buffer, reading/writing in a memory area corresponding to each path and further of shortening a data transfer time by improving the transfer processing capability.

DISCLOSURE OF INVENTION

For this purpose, a message writing apparatus according to the present invention is characterized by comprising receiving means for receiving cells having path information, the cells being obtained by division of a variable-length message, message area allocating means for extracting the path information from the received cells received by the receiving means to allocate a memory area corresponding to the path information, the memory area being larger than a size of the variable-length message, writing rank adding means for adding writing ranks to the received cells when the received cells are written in the memory area allocated by the message area allocating means, and storing means for writing the received cells in the memory area according to the writing ranks added by the writing rank adding means.

Thus, upon the reception of one cell, with regard to that cell, a cell number, a message number, the number of cells received, and others are managed in accordance with the plurality of management information, which provides an advantage in that a memory area can be put efficiently to use. Moreover, since this enables transferring a variable-length message coming from a plurality of paths, an advantage is that the transfer processing capability improves in total to realize a shortening in data transfer time. Still moreover, since the cell write in a receiving buffer memory can be done dynamically, this exhibits an advantage in that an effective utilization of a memory area becomes feasible so that a device needed for multi-connections reducible in scale to lead to cost reduction. Yet moreover, this has an advantage in that the multi-connections become possible and data from the ordinary users can be time-division-multiplexed to permit transfer of a large volume of data.

In addition, a message writing method according to the present invention is characterized by comprising a receiving step of receiving cells having path information, the cells being obtained by division of a variable-length message, a message area allocating step of extracting the path information from the received cells received in the receiving step to allocate a memory area corresponding to the path information, larger than a size of the variable-length message, a writing ranks step of adding writing ranks to the received cells when the received cells are written in the memory area allocated in the message area allocating step, and a storing step of writing the received cells in the memory area according to the writing ranks added in the writing rank step.

In this way, upon the reception of one cell, with regard to that cell, a cell number, a message number, the number of cells received, and others are managed in accordance with the plurality of management information, which provides an advantage in that a memory area can be put efficiently to use.

Still additionally, a message readout apparatus according to the present invention, which reads out each of a plurality of cells constituting a message and written in a memory area, characterized by comprising first means for reading out the message in accordance with writing ranks added in the order of receive processing of the cells, second means for reading out the message on the basis of the added writing ranks in a manner that flag information, indicative of whether or not the cells are read out, is written in the memory area, third means for reading out the message on the basis of the writing ranks based on an indication of a message storing/holding section which manages a message number of the received cells written in the memory area and writing position information thereon, and control means operable of selecting any one of the first means, the second means and the third means by setting of the memory area.

Thus, it is possible to handle a plurality of cells and to transfer a variable-length message coming from a plurality of paths, which provides an advantage in that the transfer processing capability improves in total and a shortening in data transfer time is realizable.

Yet additionally, a message readout method according to the present invention, which reads out each of a plurality of cells constituting a message and written in a memory area, characterized by comprising a first step of reading out the message in accordance with writing ranks added in the order of receive processing of the cells, a second step of reading out the message on the basis of the added writing ranks in a manner that flag information, indicative of whether or not the cells are read out, is written in the memory area, and a third step of reading out the message in accordance with the writing ranks provided by an indication of a message storing/holding section which manages a message number of the received cells written in the memory area and writing position information, with any one of the first means, the second means and the third means being selectively implemented according to setting of the memory area.

Thus, it is possible to handle cells coming from a plurality of different paths and to dynamically conduct the cell write in a receiving buffer memory, and this exhibits an advantage in that an effective utilization of a memory area becomes feasible so that a device needed for multi-connections reducible in scale to lead to cost reduction.

Furthermore, a memory address control circuit for writing of a variable-length message according to the present invention is characterized by comprising a path recognizing section for receiving, the cells being obtained by division of the variable-length message and transmitted to extract path information from the received cells, a receive control section operable of adding writing ranks on writing in a memory in correspondence with the path information outputted from the path recognizing section and of outputting a size of a writing area, a writing position of the variable-length message and the number of cells received, as management information, a received message assembling section having an address table, in which the size of the writing area, the writing position of the variable-length message and the number of received cells, corresponding to the path information, are related to each other on the basis of the management information from the receive control section for assembling the received cells with respect to one variable-length message and outputting second write information, and a memory control section operable of controlling writing in the memory on the basis of the second write information from the received message assembling section and the management information from the receive control section.

Thus, this has an advantage in that the multi-connections become possible and data from each ordinary user can be time-division-multiplexed to permit transfer of a large volume of data.

Still furthermore, a memory address control circuit for readout of a variable-length message according to the present invention is characterized by comprising a path recognizing section for receiving cells, the cells being obtained by division of the variable-length message and transmitted to extract path information from the received cells, a receive control section operable of adding writing ranks on readout in a memory in correspondence with the path information outputted from the path recognizing section and of outputting a size of a readout area, a readout position of the variable-length message and the number of received cells as management information, a received message assembling section having an address table, in which the size of the readout area, the readout position of the variable-length message and the number of received cells being corresponding to the path information, are related to each other on the basis of the management information from the receive control section and operable of assembling the received cells with respect to one variable-length message and outputting second readout information, and a memory control section operable of controlling the readout to the memory on the basis of the second readout information from the received message assembling section and the management information from the receive control section.

Thus, this exhibits an advantage in that the management of cell numbers, message numbers, the numbers of cells received and others becomes feasible through the use of a plurality of management information, which leads to efficient use of a memory area.

BRIEF DESCRIPTION OF DRAWINGS

FIG. 9(a) is an illustrative view showing a memory area in a received cell written state.

FIG. 9(b) is an illustrative view showing a memory area in a state after first cells are read out by a CPU.

FIG. 9(c) is an illustrative view showing the memory area in a state after second cells are read out by the CPU.

FIG. 9(d) is an illustrative view showing the memory area in a state after third cells are read out by the CPU.

FIG. 10(a) is an illustrative view showing a memory area in a received cell written state.

FIG. 10(b) is an illustrative view showing the memory area in a state after second cells are read out by a CPU.

FIG. 10(c) is an illustrative view showing the memory area in a state after a fourth cell is read out by the CPU.

FIG. 10(d) is an illustrative view showing a memory area after readout processing.

FIG. 11(a) is an illustrative view showing a memory area arrangement at reception of a first cell of a first message passing through a path 1.

FIG. 11(b) is an illustrative view showing a memory area arrangement at reception of a second cell of the first message passing through the path 1.

FIG. 11(c) is an illustrative view showing a memory area arrangement at reception of the last cell of the first message passing through the path 1.

FIG. 11(d) is an illustrative view showing a memory area arrangement at reception of a first cell of a second message from the path 1.

FIG. 11(e) is an illustrative view showing a memory area arrangement at reception of a second cell of the second message from the path 1.

FIG. 11(f) is an illustrative view showing a memory area arrangement at reception of a third cell of the second message from the path 1.

FIG. 12(a) is an illustrative view showing a memory area arrangement at reception of a fourth cell of the second message from the path 1.

FIG. 12(b) is an illustrative view showing a memory area arrangement at reception of a fifth cell of the second message from the path 1.

FIG. 12(c) is an illustrative view showing a memory area arrangement at reception of the last cell of the second message from the path 1.

FIG. 12(d) is an illustrative view showing a memory area arrangement at reception of a first cell of a third message from the path 1.

FIG. 12(e) is an illustrative view showing a memory area arrangement at reception of a second cell of the third message from the path 1.

FIG. 12(f) is an illustrative view showing a memory area arrangement at reception of the last cell of the third message from the path 1.

FIG. 13(a) is an illustrative view showing a memory area arrangement at reception of the last cell of a fourth message from the path 1.

FIG. 13(b) is an illustrative view showing a memory area arrangement when readout of the first message is notified to a CPU.

FIG. 13(c) is an illustrative view showing a memory area arrangement at reception of a first cell of a fifth message from the path 1.

FIG. 13(d) is an illustrative view showing a memory area arrangement at reception of a second cell of the fifth message from the path 1.

FIG. 13(e) is an illustrative view showing a memory area arrangement after a CPU reads out the second message.

FIG. 13(f) is an illustrative view showing a memory area arrangement at reception of the last cell of the fifth message from the path 1.

FIG. 14(a) is an illustrative view showing a memory area arrangement at reception of a first cell of a sixth message from the path 1.

FIG. 14(b) is an illustrative view showing a memory area arrangement at reception of a second cell of the sixth message from the path 1.

FIG. 14(c) is an illustrative view showing a memory area arrangement at reception of a third cell of the sixth message from the path 1.

FIG. 14(d) is an illustrative view showing a memory area arrangement after a CPU reads out the third message.

FIG. 14(e) is an illustrative view showing a memory area arrangement at reception of a fourth cell of the sixth message from the path 1.

FIG. 14(f) is an illustrative view showing a memory area arrangement at reception of the last cell of the sixth message from the path 1.

FIG. 15(a) is an illustrative view showing an area arrangement immediately after writing of cells of the first message, whose cell number is 2.

FIG. 15(b) is an illustrative view showing an area arrangement at writing of the first message.

FIG. 15(c) is an illustrative view showing an area arrangement at writing of the second message.

FIG. 15(d) is an illustrative view showing an area arrangement at writing of the third message.

FIG. 15(e) is an illustrative view showing an area arrangement at writing of the fourth message.

FIG. 15(f) is an illustrative view showing an area arrangement at writing of the fifth message.

FIG. 16(a) is an illustrative view showing an area arrangement before readout.

FIG. 16(b) is an illustrative view showing an area arrangement after readout of the second message.

FIG. 16(c) is an illustrative view showing an area arrangement at readout of the fourth message.

FIG. 16(d) is an illustrative view showing an area arrangement when the messages up to a ninth are written and the fifth message is being read out.

FIG. 16(e) is an illustrative view showing an area arrangement when a tenth message is written but a received cell is written in the remaining free area.

FIG. 16(f) is an illustrative view showing an area arrangement at reception of an eleventh message.

FIG. 27 is an illustrative view showing a start-up sequence of an ONU.

BEST MODE FOR CARRYING OUT THE INVENTION

(A) Description of Embodiment of the Present Invention

Figure 1:
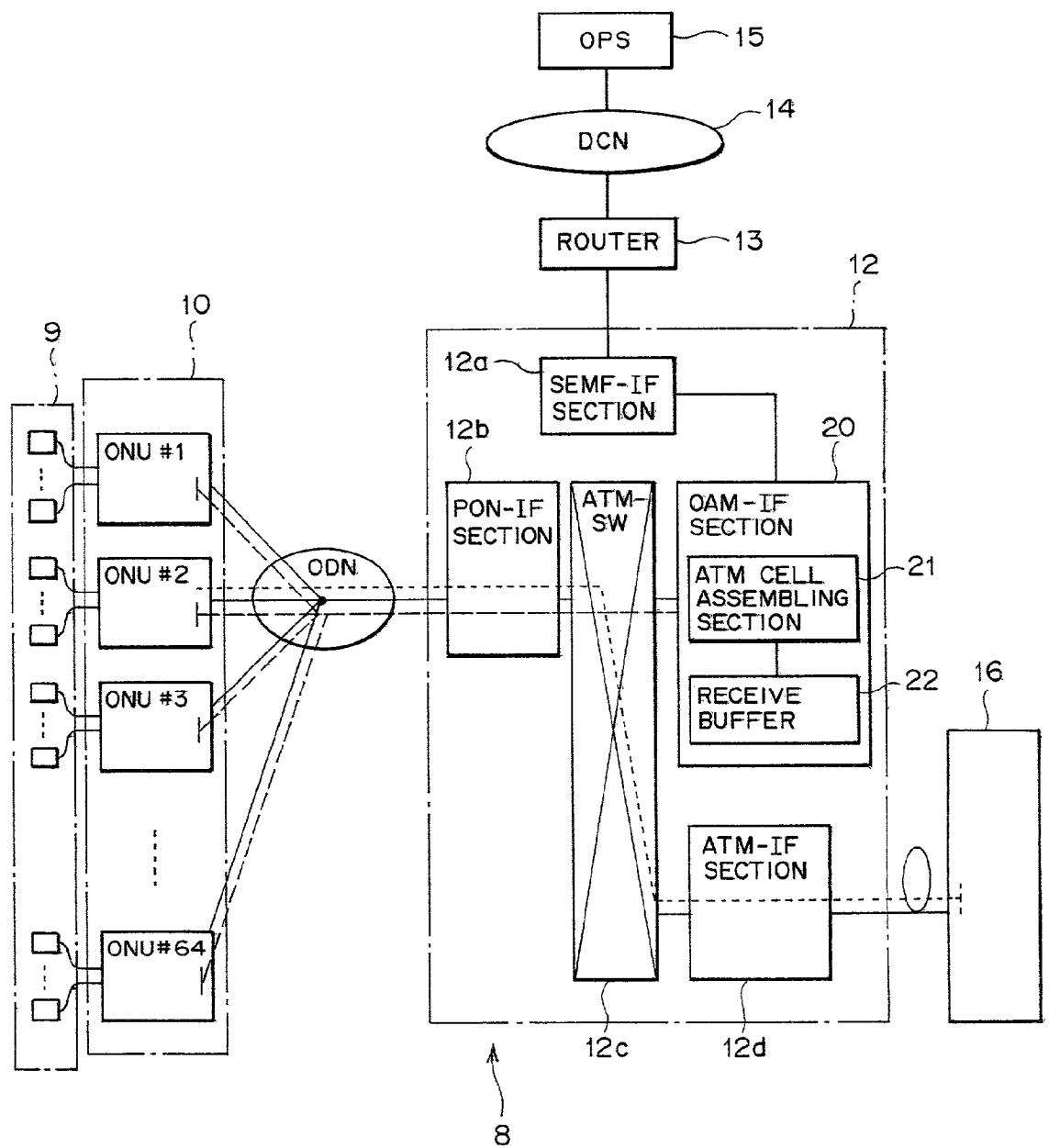
FIG. 1 is an illustrative view showing a configuration of an ATM-PON system to which the present invention is applicable.

FIG. 1 is an illustrative view showing a configuration of an ATM-PON system to which the present invention is applicable. An ATM-PON system 8, shown in this FIG. 1, is a system operable of providing, for example, a telephone service or video service, and is made up of a user terminal group 9, an ONU group 10, an ODN 11, an ATM-optical subscriber line terminating unit 12, an SDH trunk-system multiplexer 16, a router 13, a DCN 14 and an OPS 15.

The user terminal group 9 includes a plurality of user terminals, and forms terminal equipment placed in homes. The ONU group 10 comprises, for example, 64 ONUs #1 to #64, and each of the ONUs is connected to a plurality of user terminals of the user terminal group 9 so that an ATM network accommodates the ordinary users. The ODN 11 is for time-division-multiplexing ATM-PON cells in a direction from the ONU group 10 to the ATM-optical subscriber line terminating unit 12, and further for branching ATM- PON cells in a direction from the ATM-optical subscriber line terminating unit 12 to the ONU group 10. The ATM-PON cell is a cell in which identification information for PON is added to an ATM cell, and in the following description, it will be referred to as an ATM cell, unless otherwise specified particularly.

In addition, the ATM-optical subscriber line terminating unit 12 serves as an interface between optical service subscribers on the ONU group 10 side and an ATM network on the SDH trunk-system multiplexer 16 side, and for controlling transmission.

With this configuration, for example, 64 ONUs #1 to #64 receive data inputted through manipulation by the ordinary user in each home, and send out ATM-PON cells. Moreover, the ODN 11 time-division-multiplexes the ATM-PON cells sent out from each ONU, with the plurality of cells time-division-multiplexed being inputted to the ATM-optical subscriber line terminating unit 12.

Figure 2:
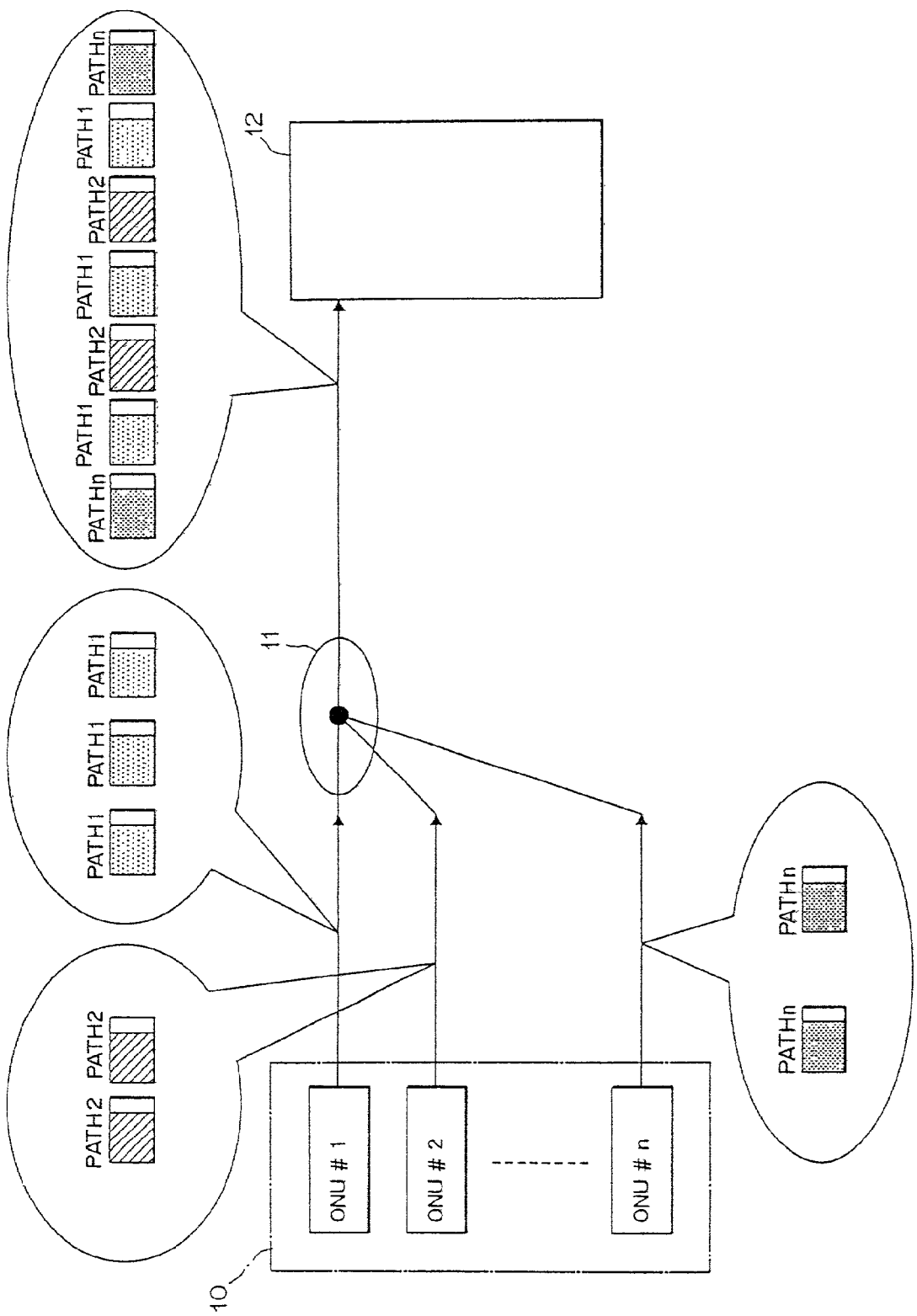
FIG. 2 is an illustrative view showing an ATM cell time division multiplex system in an ODN according to an embodiment of the present invention.

FIG. 2 is an illustrative view showing an ATM cell time-division-multiplex system in the ODN 11 according to an embodiment of the present invention. In FIG. 2, an ATM cell having information on a path 1 is sent out from one ONU #1 of the ONU group 10 to the ODN 11, and an ATM cell having information on a path n is sent out from the ONU #n thereto. These ATM cells are time-division-multiplexed in the ODN 11 and then inputted to the ATM-optical subscriber line terminating unit 12. Incidentally, for example, the value of n is 64.

The SDH trunk-system multiplexer 16 is for transmitting main signal data through the use of ATM cells, the router 13 corresponds to a station to be used in transmission of the main signal data, the DCN 14 is a digital network, and the OPS 15 is for remotely implementing centralized control of the ONU group 10 or the ATM-optical subscriber line terminating unit 12.

In FIG. 1, coarse dotted lines depict control paths (control connections) between the ATM-optical subscriber line terminating unit 12 and the ONU group 10, while a fine dotted line depicts a main signal data path (main signal connection) between the ATM-optical subscriber line terminating unit 12 and the ONU group 10.

In addition, this path (path information) signifies a path identified by the VPi and VCi in an ATM cell header, and the following embodiment will use it in a similar sense.

These establish multi-connection. For example, main signal data from the OUN group 10 existing in a city A pass through the main signal data path and are time-division-multiplexed in the ODN 11, and then are transmitted through the ATM-optical subscriber line terminating unit 12 to the SDH trunk-system multiplexer 16 existing in a city B. In addition, control signals from the 20. ONU group 10 pass through the control paths and are time-division-multiplexed in the ODN 11 and then inputted to the ATM-optical subscriber line terminating unit 12.

In FIG. 1, the ATM-optical subscriber line terminating unit 12 is composed of a PON-IF section 12b for performing a format conversion between an ATM cell and an ATM-PON cell, an ATM-SW 12c for switching main signal data outputted from the PON-IF section 12b, an ATM-IF section 12d for, when main signal data outputted from the ATM-SW 12c is transmitted to the SDH trunk-system multiplexer 16, providing an interface between the SDH trunk-system multiplexer 16 and the ATM-optical subscriber line terminating unit 12, a SEMF-IF section 12a for extracting a control command from a signal transmitted from the OPS 15, and an OAM-IF section 20 for receiving and assembling a plurality of ATM cells having different path information, outputted from the ATM-SW 12c, to convert them into an AAL5 message. The OAM-IF section 20 includes an ATM cell assembling section 21 and an external memory (received buffer) 22.

With this configuration, ATM-PON cells passing through a plurality of paths from, for example, 64 ONUs #1 to #64 are time-division-multiplexed in the ODN 11, and after the conversion from an ATM-PON cell format to an ATM cell format is made in the PON-IF section 12b, are switched in the ATM-SW 12c to be inputted to the OAM-IF section 20. In this case, in the OAM-IF section 20, a plurality of ATM cells coming from a plurality of different paths are received and assembled to be once written as a plurality of AAL5 messages in the external memory 22. Moreover, the plurality of AAL5 messages are sent out from the SDH trunk-system multiplexer 16 through the ATM-IF section 12d, while ATM cells transmitted from the SDH trunk-system multiplexer 16 undergo a cell format conversion in the ATM-IF section 12d and are outputted from the PON-IF section 12b after switched by the ATM-SW 12c.

Figure 3:
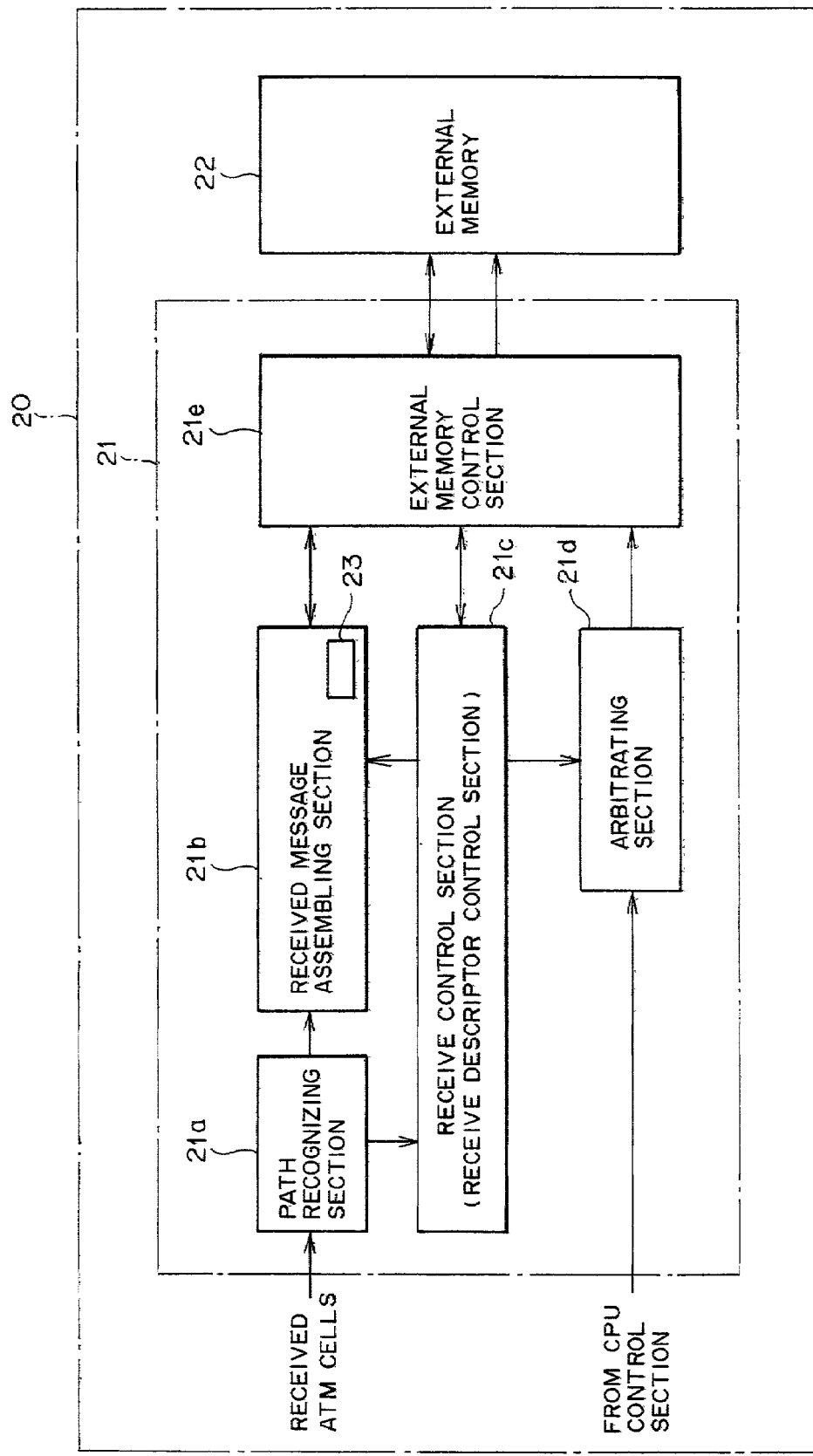
FIG. 3 is a block diagram showing an OAM-IF section according to the embodiment of the present invention.

FIG. 3 is a block diagram showing the OAM-IF section 20 according to an embodiment of the present invention. The OAM-IF section 20 shown in FIG. 3 includes the ATM cell assembling section 21 and the external memory 22. The external memory 22 is for storing data, and each of areas of this external memory 22 functions as a memory area in which written temporarily are information such as received cells, a message made by assembling these cells, a size of the data written memory area, a writing position of the message made by the assembling and the number of received cells. A detail of the write and readout will be described later.

The ATM cell assembling section 21 is for receiving and assembling a plurality of ATM cells coming from a plurality of different paths and for outputting them, and is composed of a path recognizing section 21a, a received message assembling section 21b, a receive control section (receive descriptor section) 21c, an arbitrating section 21d and an external memory control section 21e. It functions as a message writing apparatus or a message readout apparatus.

The path recognizing section 21a is for receiving cells transmitted in the form of divisions of an AAL5 message to extract path information from the received cells. Moreover, it abandons the received cells other than the path information about the reception/assembling processing.

The receive control section 21c is designed to add a writing rank on writing in the external memory 22 in correspondence to path information outputted from the path recognizing section 21a, and to output, as management information, a size of a writing area, a writing position of an AAL5 message and the number of received cells. Moreover, this receive control section 21c is made to add a readout rank on readout from the external memory 22 in correspondence to the path information from the path recognizing section 21a and to output, as management information, a size of a readout area, a readout position of an AAL5 message and the number of received cells.

The received message assembling section 21b has an address table 23 in which a size of a writing area, a writing position of an AAL5 message and the number of cells, corresponding to path information, are related to each other on the basis of management information from the receive control section 21c, and is operable of assembling received cells with respect to one AAL5 message and outputting second write information. In addition, the received message assembling section 21b has an address table 23 in which a size of a readout area, a readout position of an AAL5 message and the number of cells, corresponding to path information, are related to each other on the basis of the management information from the receive control section 21c, and is operable of assembling received cells with respect to one AAL5 message to output second readout information.

The external memory control section 21e is operable of controlling the write in the external memory 22 on the basis of the second write information from the received message assembling section 21b and the management information from the receive control section 21c. On the other hand, for the readout, the external memory control section 21e is operable of controlling the readout to the external memory 22 on the basis of the second readout information from the received message assembling section 21b and the management information from the receive control section 21c.

In addition, in FIG. 1, in a case in which a timing at which the OAM-IF section 20 receives a command from the SEMF-IF section 12a and a timing at which message assembling processing is conducted in the external memory 22 differ time-wise from each other, the arbitrating section 21d mediates this time-wise difference. That is, this arbitrating section 21d is for correcting the phase shift occurring at multiplexing, and is controlled by a signal inputted from a CPU control section (not shown). Concretely, it has a counter indicating a phase shift, and for example, if the counter value is 1000, it is recognized that the phase shift is in an allowable range, and if the counter value exceeds 1000, the shift is corrected to remove fluctuation.

Thus, the path recognizing section 21a, the received message assembling section 21b, the receive control section 21c and the external memory control section 21e cooperate with each other to function as a memory address control circuit for readout of an AAL5 message and to function as a memory address control circuit for readout of an AAL5 message.

Figure 4:
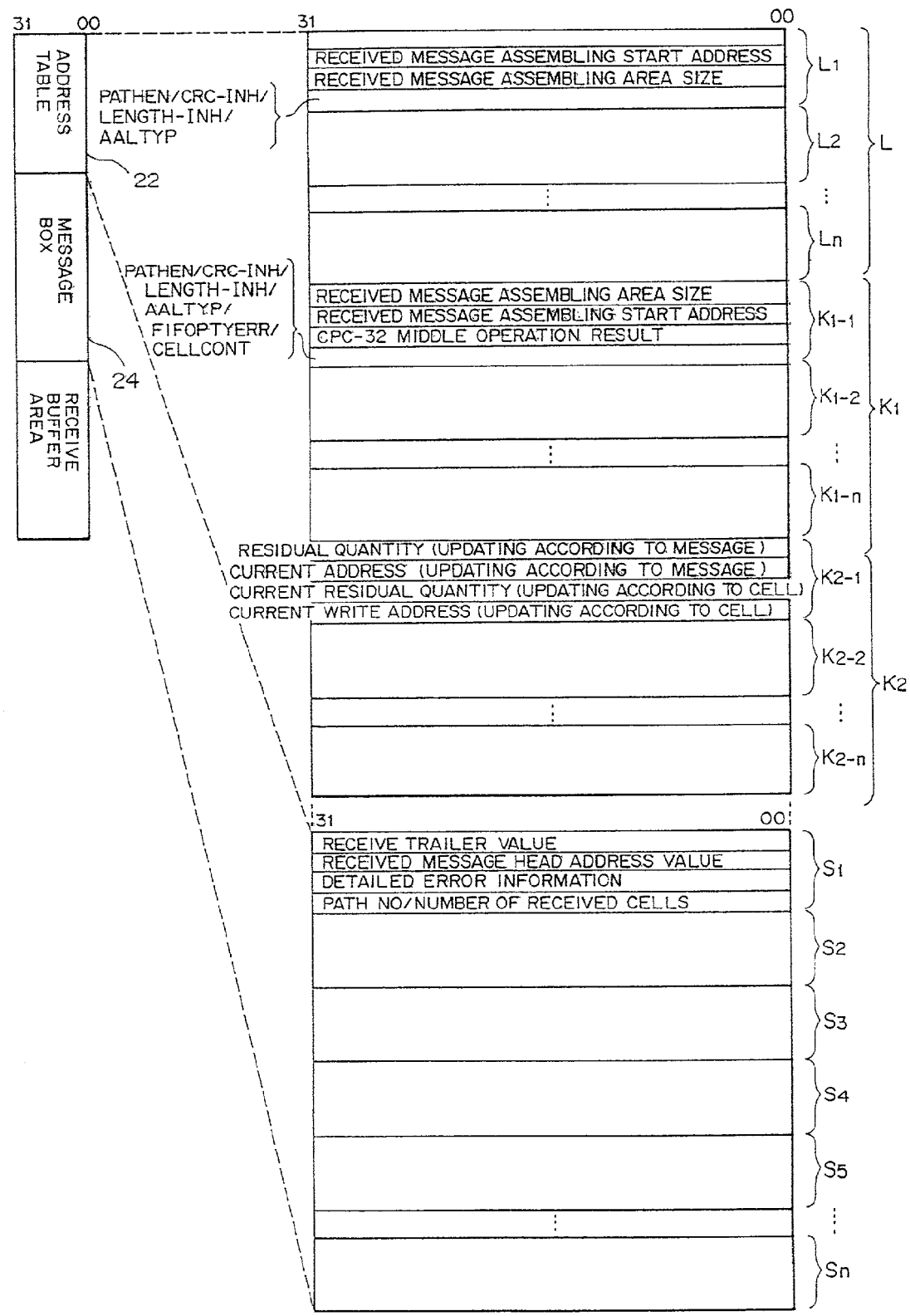
FIG. 4 is an illustrative view showing one example of mapping of memory areas in an external memory according to an embodiment of the present invention.

FIG. 4 is an illustrative view showing an example of mapping of memory areas in the external memory 22. In FIG. 4, the external memory 22 has an address table (address table area) 23, a message BOX (message BOX area) 24 and a receiving buffer area. Incidentally, although this external memory 22 has areas for operations of a CPU or the like in addition to the aforesaid areas, the description of these areas will be omitted.

This message BOX 24 is an area for conducting assembling of the received cells with respect to each path to assemble a message. The address table 23 is an area in which cells and management information on a message are written. Concretely, with respect to the cells written in the message BOX 24, there are written information such as cell numbers, the number of received cells, message numbers on the cells, sizes of memory areas for writing cells and addresses of the assembled messages.

Thus, the received cells are written in the message BOX 24 in accordance with the management information set in the address table 23 to assemble one message.

Furthermore, as FIG. 4 shows, the address table 23 comprises a lookup area (area indicated by L), an assembling work area 1 (area indicated by $K_1$) and an assembling work area 2 (area indicated by $K_2$).

The lookup area L is composed of a lookup area-path 1 (area indicated by $L_1$), a lookup area-path 2 (area indicated by $L_2$), . . . , a lookup area-path n (area indicated by $L_n$), and each of these lookup areas $L_1, L_2, \ldots, L_n$ is allocated according to path.

In addition, in detail, the lookup area $L_1$ is partitioned into a received message assembling start address, a received message assembling work area size, and an area in which written are flags: a PATHEN, a CRC-INH, a LENGTH-INH and an AALTYP. The PATHEN is an area for setting whether or not received cells are assembled with respect to that path, the CRC-INH is an area for setting whether or not to inhibit a CRC check, the LENGTH-INH is an area for setting a message length, and the AALTYP is an area for indicating the type of an adaptation layer. The lookup area $L_2, \ldots,$ the lookup area $L_n$ have a similar area configuration.

The assembling work area $K_1$ is composed of an assembling work area 1-path 1 (area indicated by $K_{1-1}$), an assembling work area 1-path 2 (area indicated by $K_{1-2}$), . . . , an assembling work area 1-path n (area indicated by $K_{1-n}$), with each being allocated with respect to each path. Moreover, in detail, the assembling work area 1-path 1 is partitioned into a received message assembling work area size, a received message assembling start address, a CRC partial operation result written area and an area in which written are flags: a PATHEN, a CRC-INH, a LENGTH-INH, an AALTYP, a FIFOPTYERR and a CELLCONT. Of these, the PATHEN, CRC-INH, LENGTH-INH and AALTYP are the same as those mentioned above, and further description thereof will be omitted. The FIFOPTYERR is an area for indicating information on whether or not an error exists in a parity check result, and the CELLCONT is an area for implementing control on the number of cells. The assembling work area $K_{1-2}, \ldots,$ the assembling work area $K_{1-n}$ have a similar configuration.

Moreover, the assembling work area $K_2$ is composed of an assembling work area 2-path 1 (area indicated by $K_{2-1}$), an assembling work area 2-path 2 (area indicated by $K_{2-2}$), . . . , an assembling work area 2-path n (area indicated by $K_{2-n}$), with each being allocated with respect to each path. Still moreover, in detail, the assembling work area $K_{2-1}$ is partitioned into a residual quantity to be updated according to message, a current address to be updated according to message, a residual quantity to be updated according to cell and a current address to be updated according to cell. The assembling work area $K_{2-2}, \ldots,$ the assembling work area $K_{2-n}$ have a similar configuration, and functions as a residual quantity examining means (which will be mentioned later).

Furthermore, the message BOX 24 is composed of a message 1 storage area (area indicated by $S_1$), a message 2 storage area (area indicated by $S_2$), . . . , a message n storage area (area indicated by $S_n$). In detail, the message 1 storage area is partitioned into a receive trailer value, a received message head address value, detailed error information, a path number and the number of received cells. The message 2 storage area, . . . , the message n storage area have a similar configuration.

Figure 5:
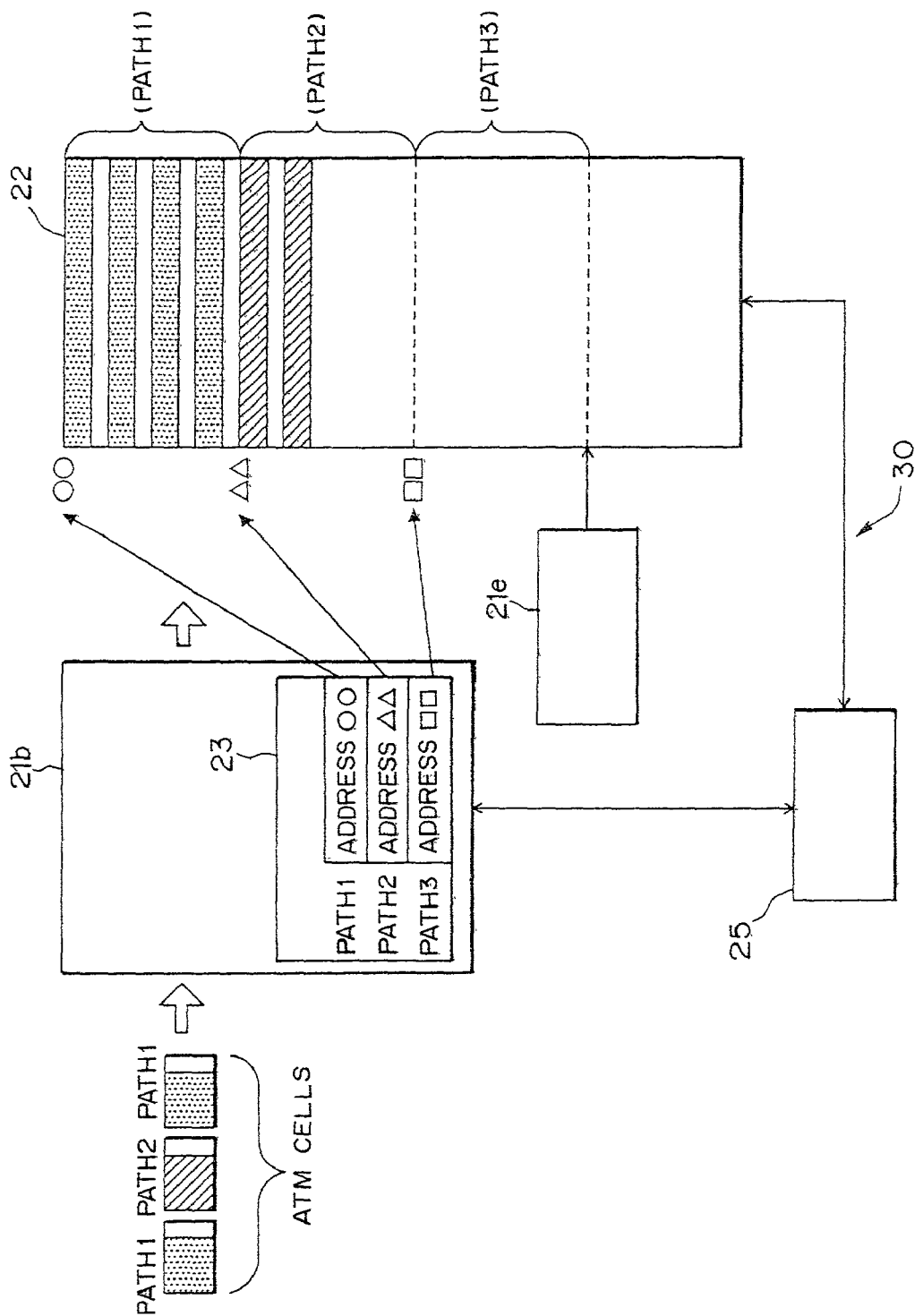
FIG. 5 is an illustrative view for explaining a method of allocating a receiving buffer area at every fixed length, according to the embodiment of the present invention.
Figure 6:
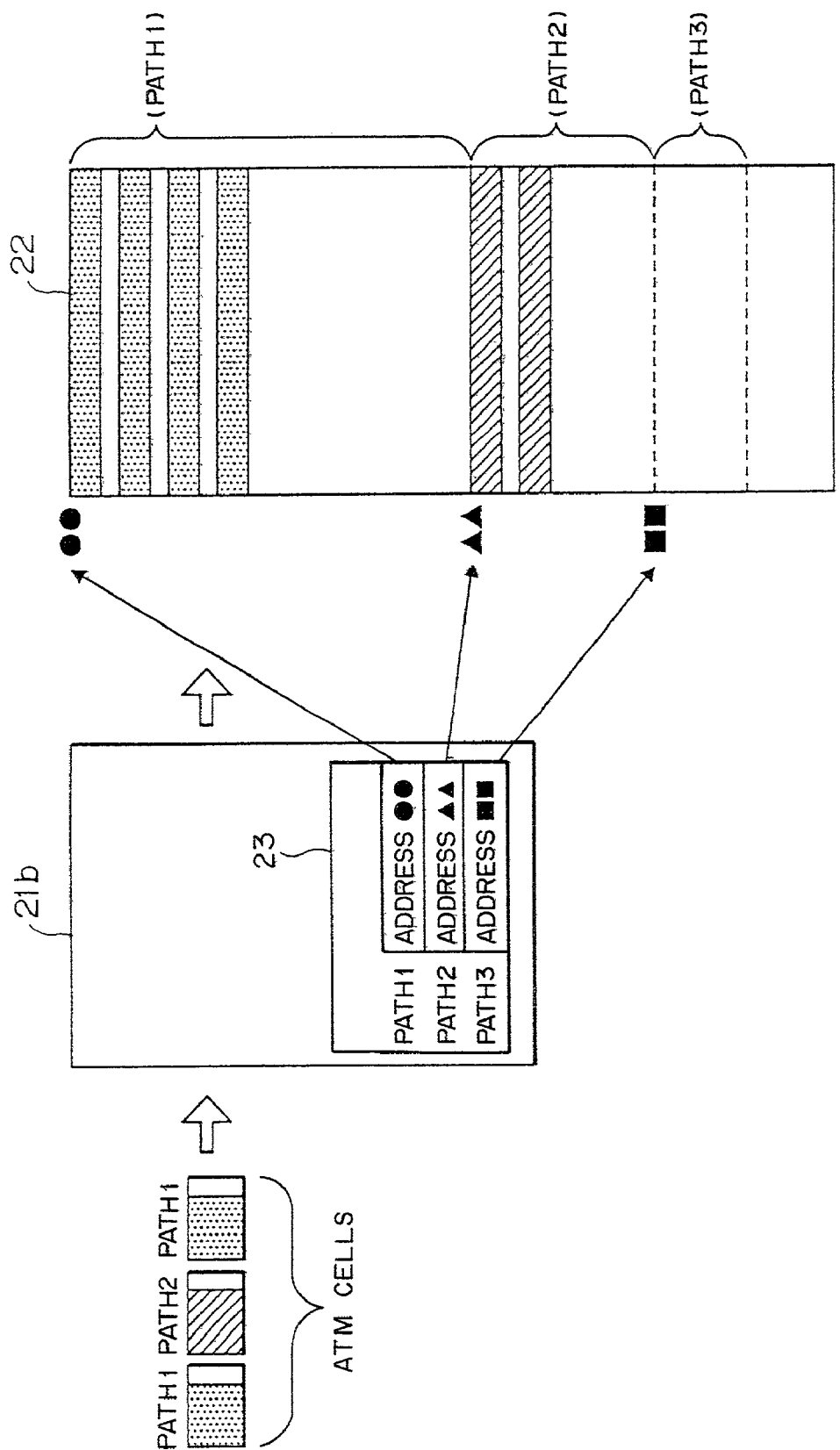
FIG. 6 is an illustrative view for explaining a method of allocating a receiving buffer area variably, according to the embodiment of the present invention.

Referring to FIGS. 5 and 6, a description will be added hereinbelow of a method of allocating a receiving buffer area variably.

FIG. 5 is an illustrative view for explaining a method of allocating a receiving buffer area at every fixed length. A message write unit 30 shown in FIG. 5 is operable of conducting writing in a memory area according to different path, and is composed of a received message assembling section 21b, an external memory control section 21e, a CPU 25 and an external memory 22.

The received message assembling section 21b is for receiving cells having path information, the cells being obtained by division of an AAL5 message, and in addition to the above-mentioned functions, also functions as a receiving means. Moreover, this received message assembling section 21b is equipped with an address table 23. In the address table 23, there are written a path name and management information such as an address of a writing area in the external memory 22, corresponding to that path, a size of the writing area and the number of cells, which are related to each other. In the message BOX 24, there is written information on the above-mentioned respective messages.

The external memory control section 21e is for extracting path information cells received by the received message assembling section 21b to allocate a memory area corresponding to the path information, the memory area 22 being larger than an AAL5 message, and functions as a message area allocating means. Moreover, this external memory control section 21e includes an address table setting means (not shown) and a message storage area setting means (not shown) which are for partitioning the external memory 22 shown in FIG. 4 into the address table 23 and the message BOX 24.

This address table setting means establishes, in the external memory 22, an address table 23 in which a size of a writing area, a writing position of an AAL5 message and the number of received cells, corresponding to path information, are related to each other on the basis of cell numbers and a message number about received cells. The message storage area setting means is for placing, in the external memory 22, a message BOX 24 which allows the received cells to be read out in units of message. Accordingly, the address table 23 functions as a writing rank adding means to add writing ranks to received cells when the received cells are written in the memory area allocated by the external memory control section 21e.

Concretely, this writing rank signifies a priority at write, and the address table 23 gives a writing rank to a received cell in the order of reception processing thereof. That is, the rank is added in the order of the cell arrival. In this connection, there is another method of adding the writing rank, and this will be described later.

Moreover, the CPU 25 is for writing the received cells in the memory area in accordance with the ranks added by the address table 23, and functions as a storing means.

Thus, when the received message assembling section 21b receives two types of ATM cells, i.e., path 1 and path 2 shown in FIG. 5, the received message assembling section 21b allocates an area in the external memory 22 by each path according to path 1 or path 2 through the use of information written in the address table 23. For example, in the address table 23, with respect to the path 1, written are an address of a writing area, a size (16 Kbyte) of the writing area and number of cells (10 cells), and with respect to the path 2, written are an address of a writing area, a size (16 Kbyte) of the writing area and number of cells (4 cells), and further, with respect to the path 3, written are an address of a writing area, a size (16 Kbyte) of the writing area and number of cells (0 cell). Incidentally, in this case, an area is ensured for the path 3 which has not come yet.

FIG. 6 is an illustrative view for explaining a method of allocating a receiving buffer area variably. In FIG. 6, when receiving two types of ATM cells, i.e., path 1 and path 2, a received message assembling section 21b variably allocates a writing area in the external memory 22 according to path 1 or path 2. For example, in the address table 23, with respect to the path 1, written are an address of a writing area, a size (48 Kbyte) of the writing area and number of cells (10 cells), and with respect to the path 2, written are an address of a writing area, a size (16 Kbyte) of the writing area and number of cells (4 cells), and further, with respect to the path 3, written are an address of a writing area, a size (0 Kbyte) of the writing area and number of cells (0 cell). Also in this case, a message BOX 24 and an area for the path 3 which has not come yet are ensured.

As mentioned above, since a size of a memory area can variably be allocated according to message, it is possible to use the memory area effectively.

Figure 7:
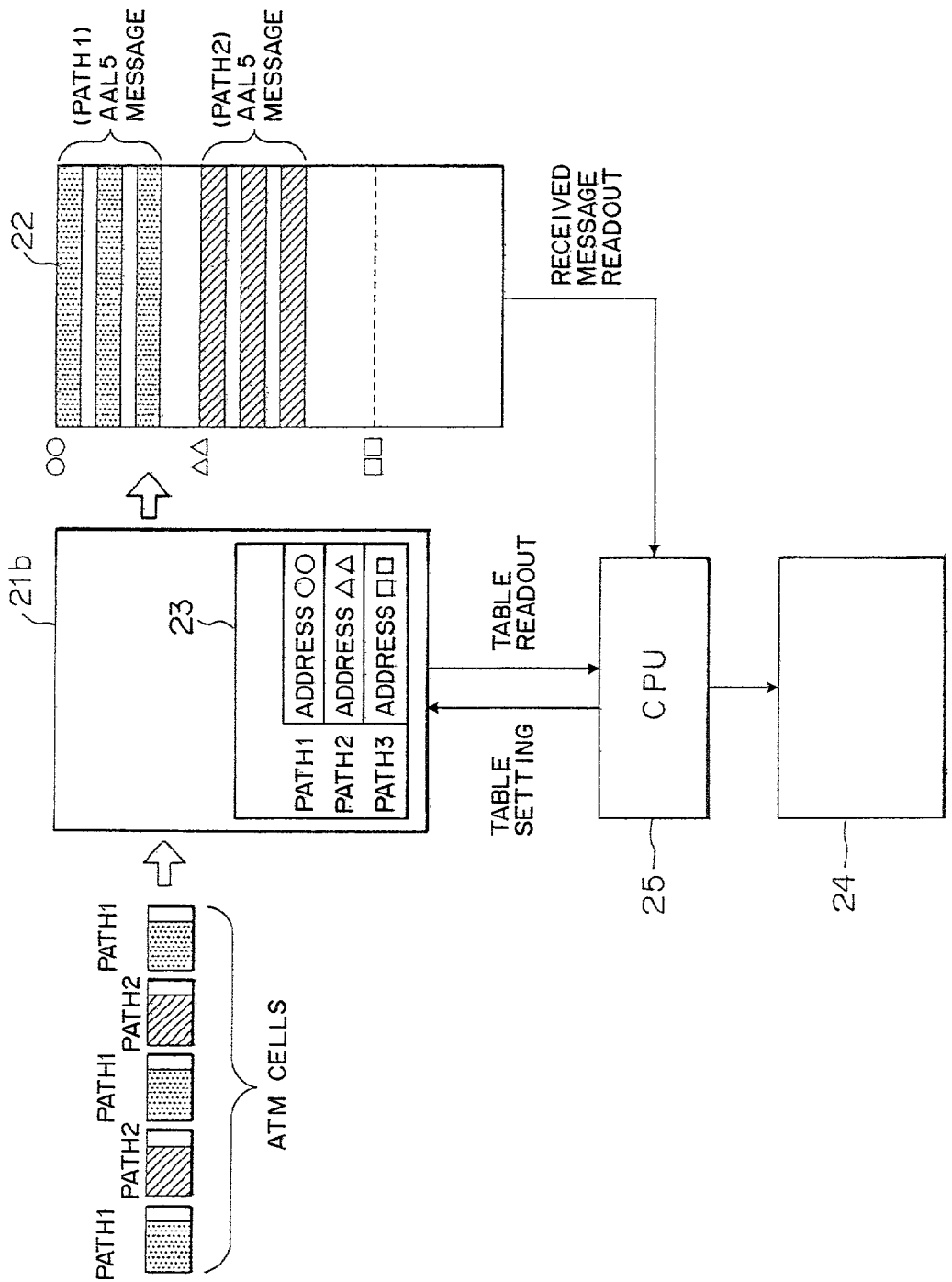
FIG. 7 is an illustrative view for explaining a method of writing an AAL5 message, according to an embodiment of the present invention.
Figure 8:
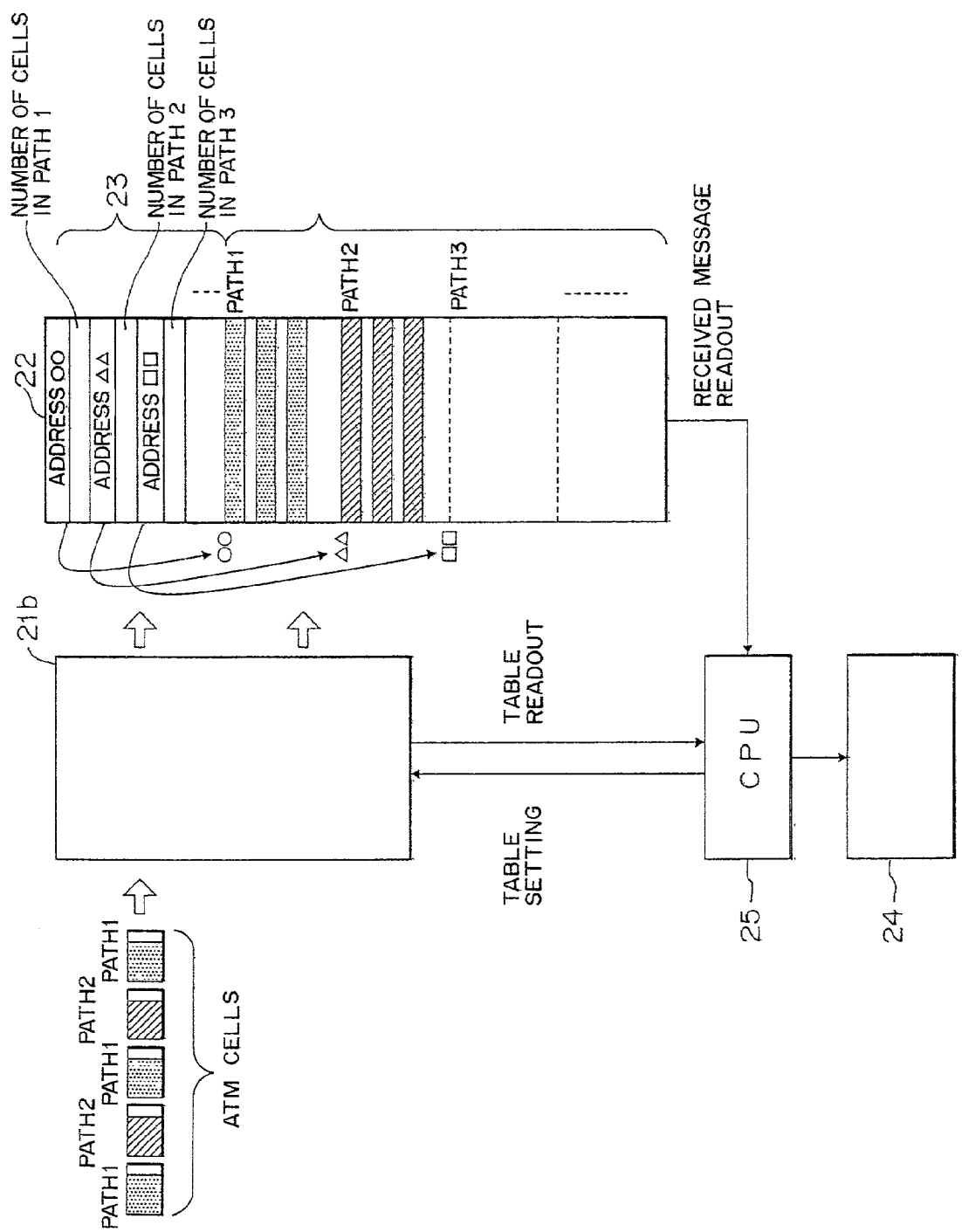
FIG. 8 is an illustrative view for explaining a second method of writing an AAL5 message, according to an embodiment of the present invention.

Furthermore, referring to FIGS. 7 and 8, a description will be added of a writing method using the aforesaid address table 23, message BOX 24 and CPU.

FIG. 7 is an illustrative view for explaining a method of writing an AAL5 message according to an embodiment of the present invention. In FIG. 7, a CPU 25 is connected to a received message assembling section 21b and an external memory 22. The external memory 22 stores a plurality of messages in its receiving buffer area, while the received message assembling section 21b has an address table 23.

When a received message readout request such as a hardware interruption is issued from the external memory 22, the CPU 25 reads out, from the address table 23, a head address of a memory area in which a message to be read out is written. Subsequently, payload data is read out from the receiving buffer area (see FIG. 4). In addition, with respect to that message, the CPU 25 sets a readout processing bit indicative of the completion of readout to a processed condition. This readout processing bit will be mentioned later.

FIG. 8 is an illustrative view for explaining a second method of writing an AAL5 message, according to an embodiment of the present invention. Unlike FIG. 7, an address table 23 shown in FIG. 8 is not placed in the received message assembling section 21b but is put in the external memory 22.

The CPU 25 is connected to the received message assembling section 21b and the external memory 22. The external memory 22 has the address table 23, a message BOX 24 and a receiving buffer area, and stores a plurality of messages.

Thus, when a received message readout request such as a hardware interruption is issued from the external memory 22, the CPU 25 reads out, from the address table 23, a head address of a memory area in which a message to be read out is written, and payload data is read out from the receiving buffer area. In addition, with respect to that message, the CPU 25 sets a readout processing bit indicative of the completion of readout to a processed condition.

As mentioned above, the received message assembling section 21b can recognize, as a free area, an area corresponding to the message read out, and can place the received cells successively in that free area. That is, this enables effective use of the limited memory area.

Referring to FIGS. 9(a) to 9(d), a description will be added of a readout method using writing ranks. In this case, writing ranks are added in the order of arrival.

FIG. 9(a) is an illustrative view showing a memory area in a received cell written state. The area of the external memory 22 shown in FIG. 9(a) is equivalent to the receiving buffer area (see FIG. 4), and for example, is partitioned into addresses AA, BB and CC. FIGS. 9(a) to 9(d) similarly show a receiving buffer area.

The area from the address AA to the address BB is allocated as a path area 1, and the area from the address BB to the address CC is allocated as a path area 2. In addition, in the path area 1, there are written three types of cells, i.e., a message (1-1), a message (1-2) and a message (1-3), and there is placed a free area. In like manner, in the path area 1, there are written cells on a message (2-1) and there is placed a free area.

FIG. 9(b) is an illustrative view showing a memory area in a state after the CPU 25 reads out first cells. The message (1-1) shown in FIG. 9(a) is read out, and the area in which that message (1-1) was written becomes a free area as shown in FIG. 9(b).

FIG. 9(c) is an illustrative view showing a memory area in a state after the CPU 25 reads out second cells. As a result of the readout of the message (1-2), the area in which that message (1-2) existed becomes a free area.

FIG. 9(d) is an illustrative view showing a memory area in a state after the CPU 25 reads out third cells. As a result of the readout of the message (1-3), the area in which that message (1-3) existed becomes a free area, and the area from the address AA to the address BB becomes a free area.

Referring to FIGS. 10(a) to 10(d), a description will be added of a readout method in a case in which writing ranks are added with a stored flag.

FIG. 10(a) is an illustrative view showing a memory area in a received cell written state. A difference between FIG. 10(a) and FIGS. 9(a) to 9(d) is that a stored flag (flag area) indicated by (K) is added to received cells in the receiving buffer area. The CPU 25 makes a decision, on the basis of the value of this stored flag, whether it is a cell already read out or whether it is a cell which is not read out yet. In the path area 1, there are written five types of messages: a message (1-1) to a message (1-5), and there is placed a free area. Moreover, in the path area 2, there is a message (2-1) and there is situated a free area.

FIG. 10(b) is an illustrative view showing a memory area in a state after the CPU 25 reads out second cells. The CPU 25 sees the stored flag on the message (1-2) shown in FIG. 10(a), makes a decision to non-readout, and conducts the readout thereof, so the area in which that message (1-2) existed becomes a free area.

FIG. 10(c) is an illustrative view showing a memory area in a state after the CPU 25 reads out a fourth cell. The CPU 25 sees the stored flag on the message (1-4) shown in FIG. 10(a), makes a decision to non-readout, and conducts the readout thereof, so the area in which that message (1-4) existed becomes a free area.

FIG. 10(d) is an illustrative view showing a memory area after the readout processing. The areas undergoing the readout processing become a free area.

As mentioned above, since the CPU 25 can examine the stored flag to make a decision on whether or not it is read out, the cells coming from a plurality of paths can be processed individually. A more detailed description about methods for the write and readout of this stored flag will be added later with reference to FIGS. 15(a) to 15(f) and FIGS. 16(a) to 16(f).

Secondly, referring to FIGS. 11(a) to 11(f), FIGS. 12(a) to 12(f), FIGS. 13(a) to 13(f), FIGS. 14(a) to 14(f) and FIGS. 15(a) to 15(f), a description will be added of methods for writing in a memory area, readout from the memory area and check of a residual quantity.

Figures 11A, 11B, 11C, 11D, 11E, 11F:
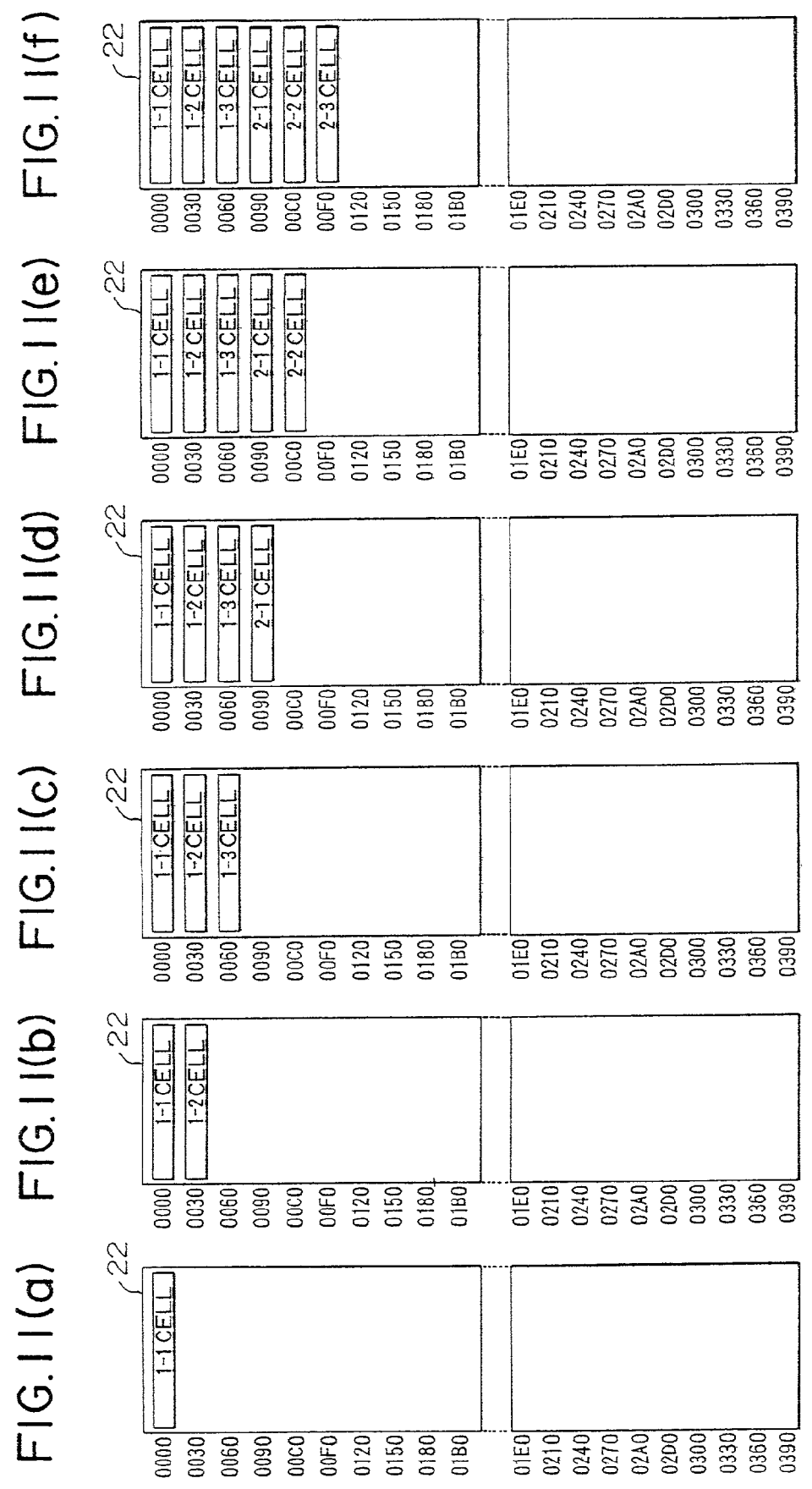

FIG. 11(a) is an illustrative view showing an allocation of a memory area arrangement at reception of a first cell of a first message on path 1. In this case, these memory areas correspond to the receiving buffer area shown in FIG. 4. Also in the figures up to FIGS. 15, they are the same. Moreover, in these memory areas, the receiving buffer area corresponding to one path has 480 bytes (10 cells), and ATM cells from a plurality of paths are allocated to another memory area (memory area from address 01E0 on) different from the path 1 to allow storage of a plurality of messages.

With respect to FIG. 11(a), the following processing is conducted. First of all, a receiving buffer head address=(0000)Hex, a receiving buffer area size=(0000)Hex and a cell count value=(0)Dec are read from the assembling work area $K_1$ (see FIG. 4), and a decision is made on whether or not it is a leading cell. Here, Hex represents hexadecimal and Dec represents decimal.

In this case, since it is the leading cell, the leading cell processing is conducted so that a lookup area (see FIG. 4) is read, and a receiving buffer head address=(0000)Hex and a receiving buffer area size=(01E0)Hex are read out.

In addition, the writing in the assembling work area $K_1$ is made as the receiving buffer head address=(000)Hex, the receiving buffer area size=(01E0)Hex and the cell count value=(1)Dec.

Following this, the assembling work area $K_2$ is read to check the residual quantity, thus providing a residual quantity (message unit)=(0)Dec, a buffer address (message unit)=(0000)Hex, a residual quantity (cell unit)=(0)Dec, a buffer address (cell unit)=(0000) Hex and a residual quantity error flag=(0)Bin where Bin denotes binary.

Moreover, the writing in the assembling work area $K_2$ is made for a check of the residual quantity, that is, a residual quantity (message unit)=(480)Dec, a buffer address (message unit)=(0000) Hex, a residual quantity (cell unit)=(432)Dec, a buffer address (cell unit)=(0030)Hex and a residual quantity error flag=(0)Bin.

This means that the address table 23 has a residual quantity examining means (assembling work areas $K_{2-1}$, $K_{2-2}$, . . . , $K_{2-n}$) to examine a size of a free area for writing of received cells by checking an indication of a head register and an indication of a message storing/holding section. In addition, the address table 23 has a residual quantity examining means (assembling work areas $K_{2-1}$, $K_{2-2}$, . . . , $K_{2-n}$) to examine a size of a free area for writing of received cells by seeing flag information. The head registers thereof will be described later as start registers 40a and 40b, while the message storing/holding section will be described later as message BOX registers 41a, 41b and 41c.

Furthermore, the message readout method is for reading out cells of a message comprising a plurality of cells and written in a memory area, and if a stored flag does not exist, a message is read out on the basis of writing ranks added in the order of the cell reception processing (first step). On the other hand, when the stored flag is set, flag information representative of whether or not the cell readout processing has been conducted is written in a memory area so that the message is read out on the basis of the added writing ranks (second step).

In addition, a message is read out on the basis of the writing ranks added by an indication of the message storing/holding section which manages a message number of received cells written in the memory area and writing position information (third step). Still additionally, one of the first step, second step and third step is selectively implemented through the setting of the memory area.

Moreover, FIG. 11(b) is an illustration of a memory area arrangement at reception of a second cell of a first message from a path 1. In like manner, the processing is conducted with respect to the path 1. First, a receiving buffer head address=(0000)Hex, a receiving buffer area size=(01E0)Hex and a cell count value=(1)Dec are read from the assembling work area $K_1$. Because of no leading cell, the leading cell processing is omitted.

Subsequently, the writing in the assembling work area $K_1$ is conducted as a receiving buffer head address=(0000)Hex, a receiving buffer area size=(01E0)Hex and a cell count value=(2)Dec.

Following this, the reading from the assembling work area $K_2$ is conducted for a check of a residual quantity, that is, a residual quantity (message unit)=(480)Dec, a buffer address (message unit)=(0000)Hex, a residual quantity (cell unit)=(432)Dec, a buffer address (cell unit)=(0030)Hex and a residual quantity error flag=(0)Bin.

In addition, the writing in the assembling work area $K_2$ is made for a check of a residual quantity, that is, a residual quantity (message unit)=(480)Dec, a buffer address (message unit)=(0000)Hex, a residual quantity (cell unit)=(384)Dec, a buffer address (cell unit)=(0060)Hex and a residual quantity error flag=(0)Bin.

In this way, upon reception of one cell, with regard to that cell, a cell number, a message number, the number of received cells and others are managed through the use of the aforesaid a plurality of management information. Accordingly, when cells from a plurality of paths are received, each cell can be managed individually.

Moreover, since this enables transfer of an AAL5 message from a plurality of paths, the transfer processing capability is improvable in total and a shortening of the data transfer time is realizable. Still moreover, since the cell writing in the receiving buffer memory is achievable dynamically, the effective use of the memory area is feasible and the PCB parts mounting area is reducible, which leads to a further reduction of the cost of PCB.

In addition, the expansion on the specification and capacity of the receiving buffer area is feasible, which permits constructing a communication unit system having a processing capability according to the traffic of a network and establishing multi-connections in units of path.

FIG. 11(c) is an illustration of a memory area arrangement at reception of the last cell of the first message from the path 1.

First, a receiving buffer head address=(0000)Hex, a receiving buffer area size=(01E0) Hex and a cell count value=(2) Dec are read from the assembling work area $K_1$.

Subsequently, the writing in the assembling work area $K_1$ is conducted to update to a cell count value=(0)Dec in a state where a receiving buffer head address=(0000)Hex and a receiving buffer area size=(01E0)Hex remain the same.

Following this, the reading from the assembling work area $K_2$ is conducted for a check of a residual quantity, that is, a residual quantity (message unit)=(480)Dec, a buffer address (message unit)=(0000)Hex, a residual quantity (cell unit)=(384)Dec, a buffer address (cell unit)=(0060)Hex and a residual quantity error flag=(0)Bin.

In addition, the writing in the assembling work area $K_2$ is made for a check of a residual quantity, that is, a residual quantity (message unit)=(336)Dec, a buffer address (message unit)=(0090)Hex, a residual quantity (cell unit)=(336)Dec, a buffer address (cell unit)=(0090)Hex and a residual quantity error flag=(0)Bin.

Still additionally, the write management information in the message BOX 24 is written. That is, written are a received data length=(144)Dec, a buffer head address=(0000)Hex and a cell count value=(3)Dec.

Since the result of the processing after the arrival of the last cell is managed, it is possible to handle the cells coming from a plurality of paths.

FIG. 11(d) is an illustration of a memory area arrangement at reception of a first cell of a second message from the path 1. First, a receiving buffer head address=(0000)Hex, a receiving buffer area size=(01E0)Hex and a cell count value=(0) Dec are read from the assembling work area $K_1$.

Then, the leading cell processing is conducted. That is, the reading from a lookup area is made, thus setting the receiving buffer head address=(0000)Hex and the receiving buffer area size=(01E0)Hex.

Subsequently, the writing in the assembling work area $K_1$ is conducted to set the receiving buffer head address=(0000) Hex, the receiving buffer area size=(01E0)Hex and the cell count value=(1)Dec.

Following this, the reading from the assembling work area $K_2$ is conducted, thus providing a residual quantity (message unit)=(336)Dec, a buffer address (message unit)=(0090)Hex, a residual quantity (cell unit)=(336)Dec, a buffer address (cell unit)=(0090)Hex and a residual quantity error flag=(0)Bin.

In addition, the writing in the assembling work area $K_2$ is made to provide a residual quantity (message unit)=(336) Dec, a buffer address (message unit)=(0090)Hex, a residual quantity (cell unit)=(288)Dec, a buffer address (cell unit)= (00C0)Hex and a residual quantity error flag=(0)Bin.

FIG. 11(e) is an illustration of a memory area arrangement at reception of a second cell of the second message from the path 1. FIG. 11(f) is an illustration of a memory area arrangement at reception of a third cell of the second message from the path 1. In like manner, the processing is conducted with respect to the path 1.

That is, in FIG. 11(e), a receiving buffer head address= (0000)Hex, a receiving buffer area size=(01E0)Hex and a cell count value=(1)Dec are read from the assembling work area $K_1$. Subsequently, the writing in the assembling work area $K_1$ is conducted, thus providing the receiving buffer head address=(0000 )Hex, the receiving buffer area size=(01E0) Hex and the cell count value=(2)Dec. Following this, the reading from the assembling work area $K_2$ is conducted as a residual quantity (message unit)=(336)Dec, a buffer address (message unit)=(0090)Hex, a residual quantity (cell unit)= (288)Dec, a buffer address (cell unit)=(00C0)Hex and a residual quantity error flag=(0)Bin. In addition, the writing in the assembling work area $K_2$ is made so that a residual quantity (message unit)=(336)Dec, a buffer address (message unit) =(0090)Hex, a residual quantity (cell unit)=(240)Dec, a buffer address (cell unit)=(00F0)Hex and a residual quantity error flag=(0)Bin.

In like manner, in FIG. 11(f), the processing is conducted with respect to the path 1. That is, a receiving buffer head address=(0000)Hex, a receiving buffer area size=(01E0)Hex and a cell count value=(3)Dec are read from the assembling work area $K_1$. Subsequently, the writing in the assembling work area $K_1$ is conducted, thus setting the receiving buffer head address=(0000)Hex, the receiving buffer area size= (01E0)Hex and the cell count value=(3)Dec. Following this, the reading from the assembling work area $K_2$ is conducted as a residual quantity (message unit)=(336)Dec, a buffer address (message unit)=(0090)Hex, a residual quantity (cell unit)= (240)Dec, a buffer address (cell unit)=(00F0)Hex and a residual quantity error flag=(0)Bin. In addition, the writing in the assembling work area $K_2$ is made so that a residual quantity (message unit)=(336)Dec, a buffer address (message unit)=(0090)Hex, a residual quantity (cell unit)=(192)Dec, a buffer address (cell unit)=(0120)Hex and a residual quantity error flag=(0)Bin.

FIG. 12(a) is an illustration of a memory area arrangement at reception of a fourth cell of the second message from the path 1, and processing is conducted in like manner. That is, a receiving buffer head address=(0000 )Hex, a receiving buffer area size=(01E0)Hex and a cell count value=(3)Dec are read from the assembling work area $K_1$. Subsequently, the writing in the assembling work area $K_1$ is conducted to provide the receiving buffer head address=(0000)Hex, the receiving buffer area size (01E0)Hex and the cell count value=(4)Dec. Following this, the reading on the assembling work area $K_2$ is conducted as a residual quantity (message unit)=(336)Dec, a buffer address (message unit)=(0090)Hex, a residual quantity (cell unit)=(192)Dec, a buffer address (cell unit)=(0120)Hex and a residual quantity error flag=(0)Bin. In addition, the writing in the assembling work area $K_2$ is made to provide a residual quantity (message unit)=(336)Dec, a buffer address (message unit)=(0090)Hex, a residual quantity (cell unit)= (144)Dec, a buffer address (cell unit)=(0150)Hex and a residual quantity error flag=(0)Bin.

FIG. 12(b) is an illustration of a memory area arrangement at reception of a fifth cell of the second message from the path 1, and processing is conducted in like manner. That is, a receiving buffer head address=(0000)Hex, a receiving buffer area size=(01E0)Hex and a cell count value=(4)Dec are read from the assembling work area $K_1$. Subsequently, the writing in the assembling work area $K_1$ is conducted to provide the receiving buffer head address=(0000)Hex, the receiving buffer area size=(01E0)Hex and the cell count value=(5)Dec. Following this, the reading from the assembling work area $K_2$ is conducted as a residual quantity (message unit)=(336) Dec, a buffer address (message unit)=(0090)Hex, a residual quantity (cell unit)=(144)Dec, a buffer address (cell unit)= (0150)Hex and a residual quantity error flag=(0)Bin. In addition, the writing in the assembling work area $K_2$ is made to provide a residual quantity (message unit)=(336)Dec, a buffer address (message unit)=(0090)Hex, a residual quantity (cell unit)=(96)Dec, a buffer address (cell unit)=(0180)Hex and a residual quantity error flag=(0)Bin.

FIG. 12(c) is an illustration of a memory area arrangement at reception of the last cell of the second message from the path 1, and processing is conducted in like manner. That is, a receiving buffer head address=(0000)Hex, a receiving buffer area size=(01E0)Hex and a cell count value=(5)Dec are read from the assembling work area $K_1$. Subsequently, the writing in the assembling work area $K_1$ is conducted to provide the receiving buffer head address=(0000)Hex, the receiving buffer area size=(01E0)Hex and the cell count value=(0)Dec. At this time, the count value is reset to 0. Following this, the reading from the assembling work area $K_2$ is conducted as a residual quantity (message unit)=(336)Dec, a buffer address (message unit)=(0090)Hex, a residual quantity (cell unit)= (96)Dec, a buffer address (cell unit)=(0180)Hex and a residual quantity error flag=(0)Bin. In addition, the writing in the assembling work area $K_2$ is made to provide a residual quantity (message unit)=(48)Dec, a buffer address (message unit)=(01B0)Hex, a residual quantity (cell unit)=(48)Dec, a buffer address (cell unit)=(01B0)Hex and a residual quantity error flag=(0)Bin.

At the time of the completion of the processing of FIG. 12(c), the write management information in the message BOX 24 is as follows. That is, a received data length=(288) Dec, a buffer head address=(0090)Hex and a cell count value=(6)Dec. FIG. 12(d) is an illustration of a memory area arrangement at reception of a first cell of a third message from the path 1, and the processing is conducted in like manner. First, a receiving buffer head address=(0000)Hex, a receiving buffer area size=(01E0)Hex and a cell count value=(0)Dec are read from the assembling work area $K_1$. Then, the leading cell processing is conducted so that the receiving buffer head address=(0000)Hex and the receiving buffer area size= (01E0)Hex are read from the lookup area. Subsequently, the writing in the assembling work area $K_1$ is conducted to provide the receiving buffer head address=(0000)Hex, the receiving buffer area size=(01E0)Hex and the cell count value=(1)Dec. Following this, the reading from the assembling work area $K_2$ is conducted as a residual quantity (message unit)=(48)Dec, a buffer address (message unit)=(01B0) Hex, a residual quantity (cell unit)=(48)Dec, a buffer address (cell unit)=(01B0)Hex and a residual quantity error flag=(0) Bin. In addition, the writing in the assembling work area $K_2$ is made to provide a residual quantity (message unit)=(48)Dec, a buffer address (message unit)=(01B0)Hex, a residual quantity (cell unit)=(0)Dec, a buffer address (cell unit)=(0000) Hex and a residual quantity error flag=(0)Bin.

Furthermore, a description will be added of a processing method to be taken for when a residual quantity error occurs. FIG. 12(e) is an illustration of a memory area arrangement at reception of a second cell of the third message from the path 1, and shows a memory area arrangement in a case in which a residual quantity error occurs. First, a receiving buffer head address=(0000)Hex, a receiving buffer area size=(01E0)Hex and a cell count value=(1)Dec are read from the assembling work area $K_1$.

Subsequently, the writing in the assembling work area $K_1$ is conducted so that the receiving buffer head address=(0000) Hex, the receiving buffer area size=(01E0)Hex and the cell count value=(2)Dec.

Following this, the reading from the assembling work area $K_2$ is conducted so that a residual quantity (message unit)= (48)Dec, a buffer address (message unit)=(01B0)Hex, a residual quantity (cell unit)=(0)Dec, a buffer address (cell unit)=(0000)Hex and a residual quantity error flag=(0)Bin, with the residual quantity (cell unit) being 0.

In addition, the writing in the assembling work area $K_2$ is made so that a residual quantity (message unit)=(48)Dec, a buffer address (message unit)=(01B0)Hex, a residual quantity (cell unit)=(0)Dec, a buffer address (cell unit)=(0000) Hex and a residual quantity error flag=(1)Bin.

In this case, the writing of the received cells is not made, while the residual quantity error flag becomes 1 and this fact is communicated.

FIG. 12(f) is an illustration of a memory area arrangement at reception of the last cell of the third message from the path 1, and shows a memory area arrangement in a case in which a residual quantity error occurs. the processing is conducted in like manner. First, a receiving buffer head address=(0000) Hex, a receiving buffer area size=(01E0)Hex and a cell count value=(2)Dec are read from the assembling work area $K_1$. Subsequently, the writing in the assembling work area $K_1$ is conducted so that the receiving buffer head address=(0000) Hex, the receiving buffer area size=(01E0)Hex and the cell count value=(0)Dec. Following this, the reading from the assembling work area $K_2$ is conducted so that a residual quantity (message unit)=(48)Dec, a buffer address (message unit)=(01B0)Hex, a residual quantity (cell unit)=(0)Dec, a buffer address (cell unit)=(0000)Hex and a residual quantity error flag=(1)Bin, with the residual quantity (cell unit) being 0. In addition, the writing in the assembling work area $K_2$ is made to set a residual quantity (message unit)=(48)Dec, a buffer address (message unit)=(01B0)Hex, a residual quantity (cell unit)=(48)Dec, a buffer address (cell unit) =(01B0) Hex and a residual quantity error flag=(0)Bin. Still additionally, the write management information in the message BOX 24 becomes a received data length=(0)Dec, a buffer head address=(0000) Hex, a cell count value=(0) Dec and a residual quantity error flag=(1)Bin.

A difference from FIG. 12(e) is that the cell count value= (2)Dec. In addition, at the reading from the assembling work area $K_2$, the residual quantity error flag is read out as 1. Still additionally, the residual quantity (cell unit) is written as (48)Dec.

In this case, the write management information in the message BOX 24 remains the same, that is, the received data length=(0)Dec, the buffer head address=(0000)Hex and the cell count value=(0)Dec, and the residual quantity error flag 1 is written therein, while the received cells are not written therein.

On the other hand, when the message length is one cell, the writing is made normally. FIG. 13(a) is an illustration of a memory area arrangement at reception of the last cell of a fourth message from the path 1. In this case, since one cell is written in the last free area, the following processing is conducted.

First, a receiving buffer head address=(0000)Hex, a receiving buffer area size=(01E0)Hex and a cell count value=(0) Dec are read from the assembling work area $K_1$.

Then, the leading cell processing is conducted. That is, the reading from a lookup area is made, thus setting the receiving buffer head address=(0000)Hex and the receiving buffer area size=(01E0)Hex.

Subsequently, the writing in the assembling work area $K_1$ is conducted to update to the cell count value=(0)Dec in a state where the receiving buffer head address=(0000)Hex, the receiving buffer area size=(01E0)Hex remain the same.

Following this, the reading from the assembling work area $K_2$ is conducted, thus setting a residual quantity (message unit)=(48)Dec, a buffer address (massage unit)=(01B0)Hex, a residual quantity (cell unit)=(48)Dec, a buffer address (cell unit)=(01B0)Hex and a residual quantity error flag=(0)Bin.

In addition, the writing in the assembling work area $K_2$ is made to provide a residual quantity (message unit)=(0)Dec, a buffer address (massage unit)=(0000)Hex, a residual quantity (cell unit)=(0)Dec, a buffer address (cell unit)=(0000)Hex and a residual quantity error flag=(0)Bin.

Still additionally, the write management information in the message BOX 24 is written. That is, written area receive data length=(48)Dec, a buffer head address=(01B0)Hex and a cell count value=(1)Dec.

At this time, the message readout notification is added to the CPU 25. FIG. 13(b) is an illustration of a memory area arrangement at the first message readout notification to the CPU 25. In this case, the write management information in the message BOX 24 is written. That is, there are written a received data length=(144)Dec, a buffer head address=(0000) Hex and a cell count value=(3)Dec.

In this state, the processing to conducted at the reception of a first cell of a fifth message is as follows. FIG. 13(c) is an illustration of a memory area arrangement at the reception of the first cell of the fifth message from the path 1, and shows a memory area arrangement in a case in which a residual quantity error occurs. In this case, the residual quantity error flag indicative of the absence of a writing area is written as (1)Bin. That is, the processing is conducted in like manner so that a receiving buffer head address=(0000)Hex, a receiving buffer area size=(01E0)Hex and a cell count value=(0)Dec are read from the assembling work area $K_1$, and the leading cell processing is conducted, and further the reading from the lookup area is made as a receiving buffer head address=(0000)Hex and a receiving buffer area size=(01E0)Hex. Subsequently, the writing in the assembling work area $K_1$ is made as the receiving buffer head address=(0000)Hex, the receiving buffer area size=(01E0) and the cell count value=(1)Dec. Following this, the reading from the assembling work area $K_2$ is made as a residual quantity (message unit)=(0)Dec, a buffer address (message unit)=(0000)Hex, a residual quantity (cell unit)=(0)Dec, a buffer address (cell unit)=(0000) Hex and a residual quantity error flag=(0) Bin. Moreover, the writing in the assembling work area $K_2$ is made as a residual quantity (message unit)=(0)Dec, a buffer address (message unit)=(0000)Hex, a residual quantity (cell unit)=(0)Dec, a buffer address (cell unit)=(0000) Hex and a residual quantity error flag=(1)Bin.

FIG. 13(*d*) is an illustration of a memory area arrangement at the reception of a second cell of the fifth message from the path 1, and shows a memory area arrangement in a case in which a residual quantity error occurs. In this case, a difference from FIG. 13(*c*) is that the cell count value becomes (1) Dec and at the readout processing from the assembling work area $K_2$, the residual error flag is read out as (1)Bin. Similarly, also at the write processing in the assembling work area $K_2$, the residual quantity error flag is written as (1)Bin. That is, the processing is conducted in like manner so that a receiving buffer head address=(0000)Hex, a receiving buffer area size=(01E0)Hex and a cell count value=(1)Dec are read from the assembling work area $K_1$, and the writing in the assembling work area $K_1$ is made as the receiving buffer head address=(0000)Hex, the receiving buffer area size=(01E0)Hex and the cell count value=(2)Dec. Following this, the reading from the assembling work area $K_2$ is made as a residual quantity (message unit)=(0)Dec, a buffer address (message unit)=(0000) Hex, a residual quantity (cell unit)=(0)Dec, a buffer address (cell unit)=(0000)Hex and a residual quantity error flag=(1) Bin. Moreover, the writing in the assembling work area $K_2$ is made as a residual quantity (message unit)=(0)Dec, a buffer address (message unit)=(0000)Hex, a residual quantity (cell unit)=(0) Dec, a buffer address (cell unit)=(0000)Hex and a residual quantity error flag=(1)Bin.

FIG. 13(*e*) is an illustration of a memory area arrangement after the CPU 25 reads out a second message. The three leading areas of the external memory 22 shown in FIG. 13(*e*) are released.

In addition, the write management information in the message BOX 24 is written so that written are a received data length=(288)Dec, a buffer head address=(0090)Hex and a cell count value=(6)Dec.

Following this, the reading on the assembling work area $K_2$ is made to set a residual quantity (message unit)=(0)Dec, a buffer address (message unit)=(0000)Hex, a residual quantity (cell unit)=(0)Dec, a buffer address (cell unit)=(0000)Hex and a residual quantity error flag=(1)Bin.

Moreover, the writing in the assembling work area $K_2$ is made for a check of a residual quantity, that is, a residual quantity (message unit)=(144)Dec, a buffer address (message unit)=(0000)Hex, a residual quantity (cell unit)=(144)Dec, a buffer address (cell unit)=(0000)Hex and a residual quantity error flag=(1)Bin.

FIG. 13(*f*) is an illustration of a memory area arrangement at reception of the last cell of the fifth message from the path 1, and shows an memory area arrangement in a case in which a residual quantity error occurs. Recognition on third/three cells is made so that the cell count value is reset to (0)Dec. That is, a receiving buffer head address=(0000)Hex, a receiving buffer area size=(01E0)Hex and a cell count value=(2) Dec are read from the assembling work area $K_1$. Then, the writing in the assembling work area $K_1$ is made as the receiving buffer head address=(0000)Hex, the receiving buffer area size=(01E0)Hex and the cell count value=(0)Dec. Following this, the reading from the assembling work area $K_2$ is made as a residual quantity (message unit)=(144)Dec, a buffer address (message unit)=(0000)Hex, a residual quantity (cell unit)= (144)Dec, a buffer address (cell unit)=(0000)Hex. Moreover, as in the case of FIG. 13(*d*), at the readout processing on the assembling work area $K_2$, the residual quantity error flag is read out as (1)Bin. Still moreover, the writing in the assembling work area $K_2$ is made as a residual quantity (message unit)=(144)Dec, a buffer address (message unit)=(0000)Hex, a residual quantity (cell unit)=(144)Dec, a buffer address (cell unit)=(0000)Hex. Since at the write processing in the assembling work area K2, there is a free area which permits the writing of a received cell, the residual quantity error flag is written as (0)Bin.

In addition, the write management information within the message BOX 24 is written to set a received data length=(0) Dec, a buffer head address=(0000)Hex and a cell count value=(0)Dec, with the residual quantity error flag being written as (1)Bin.

FIG. 14(*a*) is an illustration of a memory area arrangement at the reception of a first cell of a sixth message from the path 1. First, a receiving buffer head address=(0000)Hex, a receiving buffer area size=(01E0)Hex and a cell count value=(0) Dec are read from the assembling work area $K_1$. Then, the leading cell processing is conducted and the reading from the lookup area is made to provide the receiving buffer head address=(0000)Hex and the receiving buffer area size= (01E0)Hex.

In addition, the writing in the assembling work area $K_1$ is made as the receiving buffer head address=(0000)Hex, the receiving buffer area size=(01E0) Hex and the cell count value=(1)Dec.

Following this, the reading from the assembling work area $K_2$ is made as a residual quantity (massage unit)=(144)Dec, a buffer address (message unit)=(0000)Hex, a residual quantity (cell unit)=(144)Dec, a buffer address (cell unit)=(0000)Hex and a residual quantity error flag=(0)Bin.

Moreover, the writing in the assembling work area $K_2$ is made as a residual quantity (message unit)=(144)Dec, a buffer address (message unit)=(0000)Hex, a residual quantity (cell unit)=(96)Dec, a buffer address (cell unit)=(0030)Hex and a residual quantity error flag=(0)Bin.

FIG. 14(*b*) is an illustration of a memory area arrangement at the reception of a second cell of the sixth message from the path 1, and the processing is conducted in like manner. First, a receiving buffer head address=(0000)Hex, a receiving buffer area size=(01E0)Hex and a cell count value=(1)Dec are read from the assembling work area $K_1$. Then, the writing in the assembling work area $K_1$ is made as the receiving buffer head address=(0000)Hex, the receiving buffer area size= (01E0)Hex and the cell count value=(2)Dec. Following this, the reading from the assembling work area $K_2$ is made as a residual quantity (massage unit)=(144)Dec, a buffer address (message unit)=(0000)Hex, a residual quantity (cell unit)= (96)Dec, a buffer address (cell unit)=(0030)Hex and a residual quantity error flag=(0) Bin. Moreover, the writing in the assembling work area $K_2$ is made as the residual quantity (message unit)=(144)Dec, the buffer address (message unit)=(0000)Hex, the residual quantity (cell unit)=(48)Dec, the buffer address (cell unit)=(0060)Hex and a residual quantity error flag=(0)Bin.

FIG. 14(c) is an illustration of a memory area arrangement at the reception of a third cell of the sixth message from the path 1, and the processing is conducted in like manner. First, a receiving buffer head address=(0000)Hex, a receiving buffer area size=(01E0)Hex and a cell count value=(2)Dec are read from the assembling work area $K_1$. Then, the writing in the assembling work area $K_1$ is made as the receiving buffer head address=(0000)Hex, the receiving buffer area size=(01E0)Hex and the cell count value=(3)Dec. Following this, the reading from the assembling work area $K_2$ is made as a residual quantity (message unit)=(144)Dec, a buffer address (message unit)=(0000)Hex, a residual quantity (cell unit)=(48)Dec, a buffer address (cell unit)=(0060)Hex and a residual quantity error flag=(0)Bin. Moreover, the writing in the assembling work area $K_2$ is made as the residual quantity (message unit)=(144)Dec, the buffer address (message unit)=(0000)Hex, the residual quantity (cell unit)=(0) Dec, the buffer address (cell unit)=(0090)Hex and a residual quantity error flag=(0)Bin. In these FIGS. 14(b) and 14(c), the count value of received cells and the write head address of the memory area are incremented. That is, by the processing after the area arrangement shown in FIG. 14(c), the cell count value becomes (3)Dec, and the buffer address (cell unit)=(0090) and the residual quantity error flag=(0)Bin.

At this time, the readout processing is conducted with respect to the third message. This third message was not written in FIGS. 12(e) and 12(f). FIG. 14(d) is an illustration of a memory area arrangement after the CPU 25 reads out the third message. Six areas (address 0090 to address 0180) of the external memory 22 shown in FIG. 14(d) are released.

In addition, the write management information in the message BOX 24 is written so that written are a received data length=(0)Dec, a buffer head address=(0000)Hex, a cell count value=(0)Dec and a residual quantity error flag=(1)Bin. Accordingly, the readout processing is not conducted with respect to the third message, and for indicating this, the residual quantity error flag=(1)Bin.

Following this, the reading from the assembling work area $K_2$ is made as a residual quantity (message unit)=(144)Dec, a buffer address (message unit)=(0000)Hex, a residual quantity (cell unit)=(0)Dec, a buffer address (cell unit)=(0090)Hex and a residual quantity error flag=(0)Bin. This can indicate that there is a sufficient area.

Moreover, the writing in the assembling work area $K_2$ is made for a check of the residual quantity, that is, the residual quantity (message unit)=(432)Dec, the buffer address (message unit)=(0000)Hex, the residual quantity (cell unit)=(288)Dec, the buffer address (cell unit)=(0090)Hex and a residual quantity error flag=(0)Bin.

Furthermore, FIG. 14(e) is an illustration of a memory area arrangement at the reception of a fourth cell of the sixth message from the path 1. First, a receiving buffer head address=(0000)Hex, a receiving buffer area size=(01E0)Hex and a cell count value=(3)Dec are read from the assembling work area $K_1$.

Then, the writing in the assembling work area $K_1$ is made as the receiving buffer head address=(0000)Hex, the receiving buffer area size=(01E0)Hex and the cell count value=(4)Dec.

Following this, the reading from the assembling work area $K_2$ is made to obtain a residual quantity (message unit)=(432)Dec, a buffer address (message unit)=(0000)Hex, a residual quantity (cell unit)=(288)Dec, a buffer address (cell unit)=(0090)Hex and a residual quantity error flag=(0)Bin.

Moreover, the writing in the assembling work area $K_2$ is made as the residual quantity (message unit)=(432)Dec, the buffer address (message unit)=(0000)Hex, the residual quantity (cell unit)=(240)Dec, the buffer address (cell unit)=(00C0)Hex and a residual quantity error flag=(0)Bin.

Lastly, FIG. 14(f) is an illustration of a memory area arrangement at the reception of the last cell of the sixth message from the path 1. That is, a receiving buffer head address=(0000)Hex, a receiving buffer area size=(01E0)Hex and a cell count value=(4)Dec are read from the assembling work area $K_1$. Then, the writing in the assembling work area $K_1$ is made as the receiving buffer head address=(0000)Hex, the receiving buffer area size=(01E0)Hex and the cell count value=(5)Dec. Following this, the reading from the assembling work area $K_2$ is made to obtain a residual quantity (message unit)=(432)Dec, a buffer address (message unit)=(0000)Hex, a residual quantity (cell unit)=(240)Dec, a buffer address (cell unit)=(00C0)Hex and a residual quantity error flag=(0) Bin. Moreover, the writing in the assembling work area $K_2$ is made as the residual quantity (message unit)=(192) Dec, the buffer address (message unit)=(00F0)Hex, the residual quantity (cell unit)=(192)Dec and the buffer address (cell unit)=(00F0)Hex. Since at the write processing in the assembling work area $K_2$, there is a free area for received cells, a residual quantity error flag is written as (0)Bin.

That is, recognition on fourth/four cells is made so that the cell count value is set to (4)Dec. In addition, at the readout processing from the assembling work area $K_2$, the residual quantity (cell unit) becomes (240)Dec. Still additionally, at the write processing from the assembling work area $K_2$, the residual quantity (message unit)=(192)Dec, the buffer address (message unit)=(00F0)Hex, the residual quantity (cell unit)=(192)Dec, the buffer address (cell unit)=(00F0) Hex, and the residual quantity error flag=(0)Bin.

Moreover, the write management information in the message BOX 24 is written so that written are a received data length=(240)Dec, a buffer head address=(0000)Hex and a cell count value=(5)Dec.

When one cell is received in this way, with regard to that cell, a cell number, a message number, the number of received cells and others are managed through the use of the aforesaid plurality of management information. Accordingly, upon the reception of cells coming from a plurality of paths, the management can be made individually with respect to each cell.

Referring to FIGS. 15(a) to 15(f), a more detailed description will be added of the write method using a stored flag mentioned above with reference to FIGS. 10(a) to 10(d). Moreover, a readout method using a stored flag will be described thereafter with reference to FIGS. 16(a) to 16(f).

FIGS. 15(a) to 15(f) are illustrations for explaining a write method in which writing ranks are added through the use of a stored flag. These FIGS. 15(a) to 15(f) show a write example in which a receiving buffer area corresponding to one path are set in a range from an address 0000 to an address 0FFF (4 Kbyte).

FIG. 15(a) is an illustration of an area arrangement immediately after the writing of a cell, whose cell number is 2, in a first message. A cell (1-1), together with a stored flag, is written at the address 0000 of the external memory 22 shown in FIG. 15(a). This stored flag is expressed by bits constituting two bytes, and is composed of a message number and a readout processing bit. Accordingly, it functions as a flag area. For example, when the message number is 1 and the readout processing bit is 0 (processed), this is expressed as follows.

(K1) 01+0 (processed)

Thus, the address table 23 is made to add a writing rank to a received cell in a manner that flag information on whether or not the received cell is read out is written in the flag area (K1) placed in a memory area.

In addition, in this FIG. 15(a), there are indicated start registers 40a, 40b and message BOX registers 41a, 41b, 41c. The start register 40a functions as a head address holding section to manage a writing position at which a received cell is written in the memory area. The start register 40b is for representing a message number status. The indication is made such that the next write address is 0100 and the number of a message being assembled is 01.

Moreover, in FIG. 15(a), the message BOX register 41a indicates a message number, and the message BOX register 41b indicates a message head address, and these function as a message storing/holding section to manage the message number of the received cell written and the write address. The message BOX register 41c indicates the number of cells in the message.

Thus, the address table 23 is made to add a writing rank by reading out the indication of the head address holding section (start registers 40a, 40b) for managing the writing position at which the received cell is written in the memory area and the indication of the message storing/holding section (message BOX registers 41a, 41b, 41c) for managing the message number of the received cell written and the writing position information.

In addition, when reading out each cell of a message comprising a plurality of cells and written in the memory area, the message readout apparatus can read out the written cell by three means mentioned below in (i) to (iii) through the use of the CPU 25 and the external memory 22. That is, the address table 23 of the message readout apparatus functions as a control means and can select one of the first means, the second means and the third means through the setting of the memory area.

(i) First Means

A message is read out on the basis of a writing rank added in the order of the cell reception processing.

(ii) Second Means

A message is read out on the basis of a writing rank added in a manner that flag information (stored flag) indicative of whether or not the readout processing is conducted with respect to the cell is written in the memory area.

(iii) Third Means

A message is read out on the basis of the writing rank added by an indication of the message storing/holding section (message BOX registers 41a, 41b, 41c) which manages the message number of the received cell written in the memory area and the writing position information.

FIG. 15(b) is an illustration of an area arrangement when a first message is written. The arrangement shown in FIG. 15(b) is taken at the reception of a message comprising five cells, and the start register 40a indicates an address 0250.

FIG. 15(c) is an illustration of an area arrangement at the writing of a second message. The arrangement shown in FIG. 15(c) is taken at the reception of a message comprising two cells, and holds write information on the first message and write information on the second message. Concretely, the message BOX registers 41a, 41b and 41c indicate that the message number is 1, the message head address is 0000 and the number of cells in the message is 5, and further indicate that the message number is 2, the message head address is 0250 and the number of cells in the message is 2.

Similarly, FIG. 15(d) is an illustration of an area arrangement at the writing of a third message, FIG. 15(e) is an illustration of an area arrangement at the writing of a fourth message, and FIG. 15(f) is an illustration of an area arrangement at the writing of a fifth message. The contents shown in these illustrations are the same as those mentioned with reference to FIG. 15(c), and the repeated description thereof will be omitted.

This allows the CPU 25 to see the stored flag for making a decision on whether already read out or not, and hence, it is possible to individually handle cells coming from a plurality of paths.

Secondly, a description will be added of a flow of the readout. FIGS. 16(a) to 16(f) are illustrations for explaining a method of adding a writing rank through the use of the stored flag to read out a written cell. Five types of messages are written in a receiving buffer area shown in FIGS. 16(a) to 16(f). In addition, each of stored flags (K1) to (Ka) functions as a flag area.

FIG. 16(a) is an area arrangement before readout. As FIG. 16(a) shows, there are written a first message 1 (address 0000 to address 0250) having a five-cells arrangement, a second message 2 (address 0250 to address 0350) having a two-cells arrangement, a third message 3 (address 0350 to address 0500) having a three-cells arrangement, a fourth message 4 (address 0350) having a one-cell arrangement, and a fifth message 5 (address 0550 to 0700) having a three-cells arrangement.

In this case, the stored flag, the start registers 40a, 40b and the message BOX registers 41a, 41b, 41c are the same as those mentioned above, and the repeated description thereof will be omitted. In addition, also with respect to the following illustrations, the description of the same contents may be omitted.

FIG. 16(b) is an illustration of an area arrangement after readout of the second message. The message written in the second place is read out, and this creates a free area. At this time, the stored flag (K2) for the second message assumes the following indication.

(K2) 02+0 (processed)

FIG. 16(c) is an illustration of an area arrangement at the readout of the fourth message, and in the case of the area arrangement at the readout of the fourth message, the stored flag at this time takes the following indication.

(K2) 02+0 (processed)
(K4) 04+0 (processed)

For example, the stored flag on the sixth message which has not yet been read out at this time takes the following indication.

(K6) 06+1 (non-processed)

FIG. 16(d) is an illustration of an area arrangement when the messages up to the ninth are written and the fifth message is being readout. For example, the stored flags for the fifth and ninth messages have the following indications, respectively.

(K5) 05+1 (non-processed)
(K9) 09+1 (non-processed)

The (K5) is changed to 05+1 (processed) after read out.

FIG. 16(e) is an illustration of an area arrangement when the messages up to the tenth have been written and in a case in which received cells can be written in the remaining free areas. For example, the stored flags on the fifth and tenth messages have the following indications, respectively.

(K5) 05+0 (processed)
(Ka) 0a+1 (non-processed)

Thus, the CPU 25 performs the write and readout on received cells through the use of the values of the stored flag and, thereafter, updates the management information. This enables processing cells coming from a plurality of paths without abandoning. Moreover, efficient use of a free area becomes feasible.

In addition, it is possible to monitor the size of the remaining free area of the memory area through the use of these values. FIG. 16(f) is an illustration of an area arrangement at the reception of an eleventh message. This eleventh message comprises five cells, and the remaining free area does not permit the writing.

As mentioned above, in the case of small remaining free area, the new writing is inhabitable, which can prevents a non-processed area from being subjected to writing in a state invaded.

The cell assembling processing is conducted with this arrangement. A description will be added hereinbelow of a method for writing in a receiving buffer area in cell units and in message units.

Figure 17:
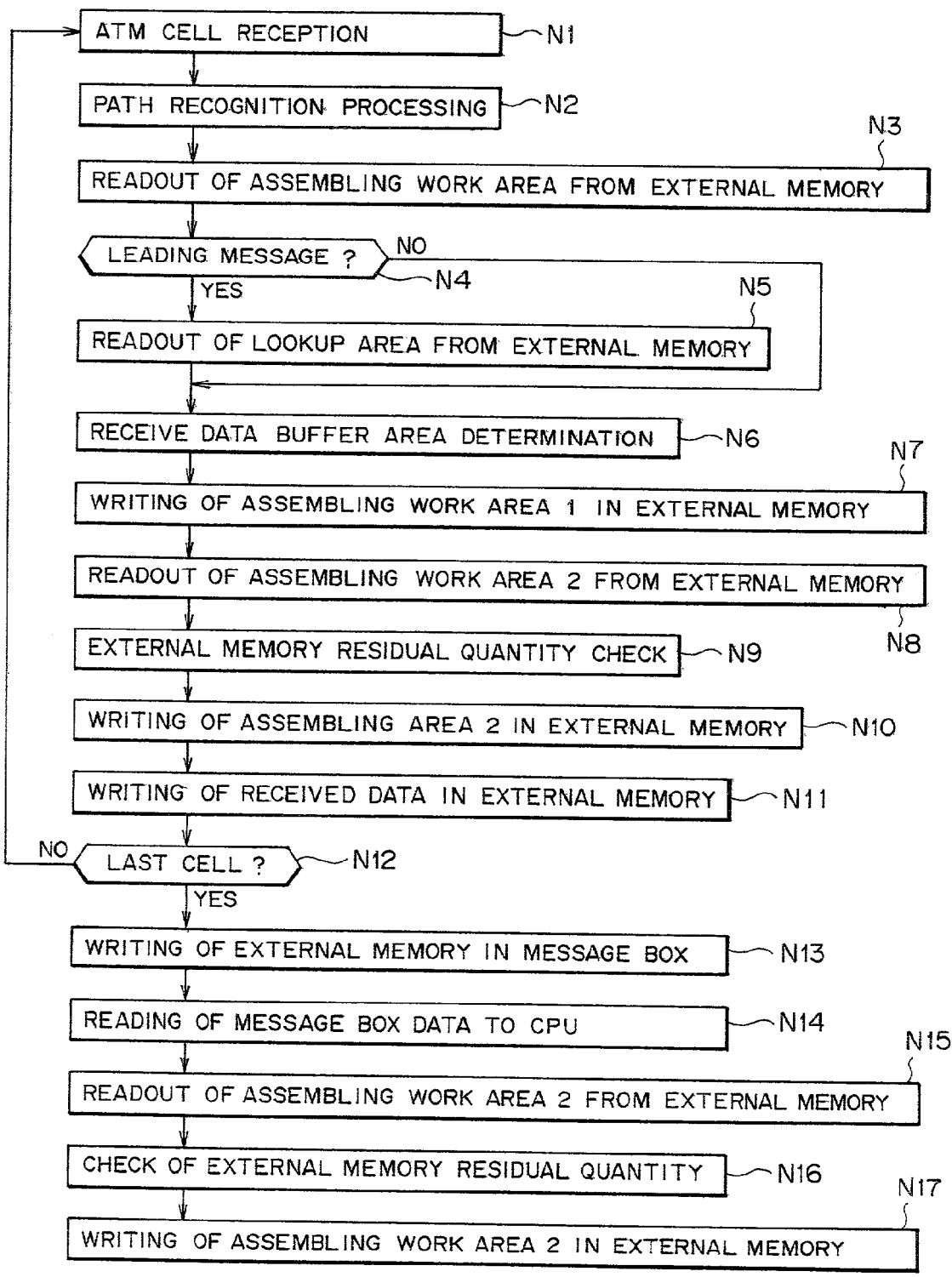
FIG. 17 is a flowchart showing a receive processing operation according to an embodiment of the present invention.

FIG. 17 is a flowchart showing an operation for receive processing according to an embodiment of the present invention. First of all, in a step N1, cells being divisions of an AAL5 message and having path information are received from a plurality of points (receive step), and in a step N2, path recognition processing is conducted to extract the path information on the cells received in the receive step for allocating a memory area larger than the size of the AAL5 message corresponding to the path information (message area allocating step), thereby generating an address $K_1$ of an assembling work area $K_1$ in the address table corresponding to that path.

Following this, in a step N3, the read processing on the assembling work area $K_1$ is conducted to read out the assembling work area $K_1$ data corresponding to that path on the basis of the address $K_1$ generated in the step N2. That is, a cell count value in an area $K_{1-1}$ (represents a path 1 in the assembling work area $K_1$) of the assembling work area $K_1$ corresponding to that path is read out from the address $K_1$ to make a decision on whether it is the head or non-head.

Subsequently, in a step N4, the message head recognition processing is conducted to make a decision, on the basis of the cell count value of the data of the assembling work area $K_1$ (area indicated by $K_1$) read in the step N3, as to whether or not a cell being processed currently is the head of the message. If it is the head, an YES route is taken so that a lookup area address corresponding to that path is generated and, in a step N5, the lookup area data corresponding to that path is read out on the basis of the generated address. If it is the non-head, a NO route is taken so that the lookup area read processing is not conducted but the receiving buffer area determination processing is conducted on the basis of the assembling work area $K_1$ data in a step N6.

The receiving buffer area determination processing in the step N6 is as follows. That is, upon the reception of the message head, a decision is made as to whether the message assembling processing is conducted in accordance with the PATHEN setting of the lookup area data, or the cells are abandoned without the message assembling. Moreover, upon the reception of other than the message head, a decision is made as to whether the message assembling processing is conducted in accordance with the PATHEN setting of the assembling work area data or the cells are abandoned without the message assembling. At this time, if the setting shows the message assembling processing, addresses for writing of received data are generated on the basis of a received message start address.

In addition, the assembling work area $K_1$ write processing is conducted in a step N7. That is, the cell count value of the assembling work area data read out in the step N3 is updated by +1, and overwritten in the assembling work area for the assembling work area data in the address table of the external memory, read out in the step N3. Moreover, at the reception of the message head, the lookup area data itself, read out in the step N5, is overwritten in the assembling work area in the address table.

The assembling work area $K_2$ write processing is conducted in step N8. After the completion of the processing in the step N7, an address of the assembling work area $K_2$ of the external memory corresponding to that path is generated and read out.

Accordingly, when a received cell is written in the memory area allocated in the aforesaid message area allocating step, a writing rank is added to the received cell (writing rank step).

The external memory residual quantity check processing is conducted in a step N9, and the assembling work area $K_2$ write processing is conducted in a step N10. A check on the residual quantity of the receiving buffer area is made on the basis of the residual quantity value of the assembling work area $K_2$ read out in the step N7, and with respect to a cell on which a residual quantity error (when the remaining area is smaller than an area corresponding to one cell) occurs, in order to abandon the entire message corresponding to that cell, a flag is set at a residual quantity error bit of the assembling work area $K_2$ data read out in the step N8 until the last cell of the message is received, and overwritten in the assembling work area $K_2$ in the address table of the external memory.

When the residual quantity check shows no error, updating is made such that 48 is subtracted from the residual quantity value of the assembling work area $K_2$ read out in the step N8 and 48 is added to a data writing head address value for the next reception, and these values are overwritten in the assembling work area $K_2$ in the address table.

Furthermore, the received data write processing is conducted in a step N11. On the basis of the head address of the receiving buffer area for the assembling work area $K_2$ data read out in the step N8, 48 bytes constituting a payload portion of the received data are written in the receiving buffer area. That is, the received cells are written in the memory area in accordance with the writing ranks added in the aforesaid writing rank step (storing step). In addition, after the processing in the step N11, a decision is made as to whether or not it is the last cell.

Moreover, in a step N12, a decision is made as to whether or not it is the last cell (the last cell of the message in units of path). If the decision shows the last cell, the YES route is taken so that the message BOX notification processing is conducted in a step N13. That is, when the decision is made to the last cell of the message, the information on that message, i.e., a write head address of the receiving buffer area, a message length, a receive trailer value and each error information, are written in the message BOX area, and the message assembling in path unit comes to an end. Moreover, the IRQ notification is made to the CPU in a manner that they are written in the message BOX area.

Subsequently, the message BOX readout processing to the CPU is conducted in a step N14. That is, the CPU reads out the data written in the message BOX area on the basis of the IRQ notification, and reads out a received message of the received buffer area from information of the data.

In this connection, if the decision in the step N12 does not show the last cell, the NO route is taken so that the operation returns to the step N1 to repeatedly implement the aforesaid steps N2 to N12.

Furthermore, the assembling work area $K_2$ readout processing is conducted in a step N15. After the completion of the processing in the step N14, the assembling work area $K_2$ for that path is read out. In addition, the residual quantity is updated in a step N16 and the assembling work area $K_2$ write processing is conducted in a step N17. That is, a value corresponding to the message length read out in the step N14 is added to the residual quantity value of the assembling work area $K_2$ data read out in the step N15 for the write updating of the assembling work area $K_2$ for the next processing.

Thus, when one cell is received, with regard to that cell, a cell number, a message number, the number of received cells and others are managed through the use of the aforesaid plurality of management information; therefore, the efficient use of the memory area becomes feasible.

Moreover, since the transfer of the AAL5 message from a plurality of paths becomes possible in this way, the transfer processing capability is improvable in total and a shortening of the data transfer time is realizable. Still moreover, since the cell writing in the receiving buffer memory becomes dynamic, the effective use of the memory area becomes possible and the PCB parts mounting area is reducible, which leads to promoting the cost reduction of PCB.

In addition, the multi-connections (see FIG. 1) can be made in this way. That is, it is possible to time-division-multiplex the data from ordinary users, which enables transfer of a large volume of data.

Figure 18:
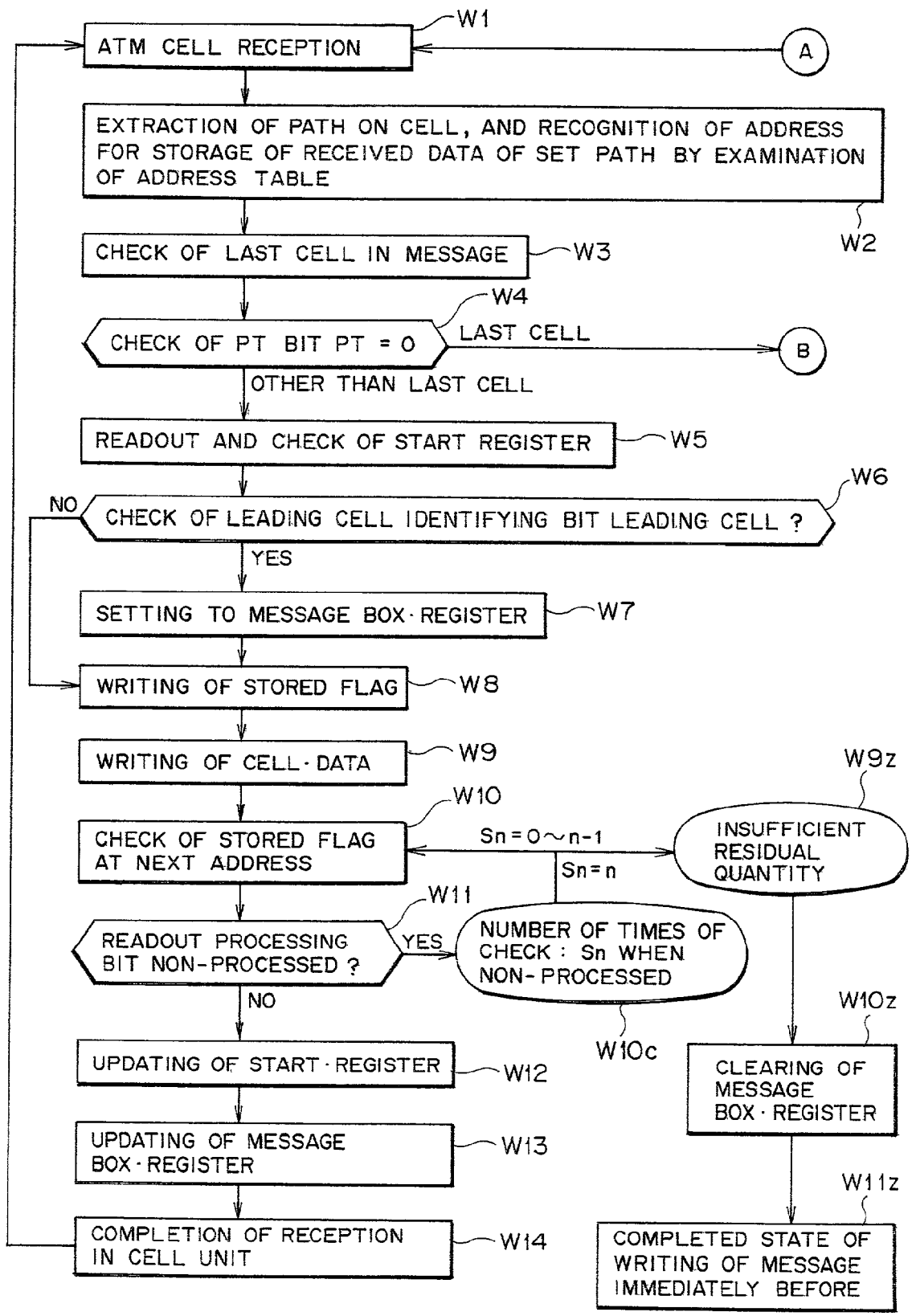
FIG. 18 is a flowchart showing receive processing using a stored flag, according to an embodiment of the present invention.

FIG. 18 is a flowchart showing receive processing using a stored flag, according to an embodiment of the present invention. Moreover, the processing is a write processing flowchart for other than the last cell.

First of all, upon reception of ATM cells from a plurality of points (step W1), the path on the ATM cells is extracted, and the address table set in advance is referred to, and further addresses for storing payload data of the received cells are recognized on the basis of the set path (step W2).

Moreover, a check is made as to the order of the cells in the message, and a check is made as to whether the incoming received cell is the last cell of the AAL5 message or another cell (step W3). Still moreover, in a step W4, a check is made on the PT bit of the header of the received cell. If PT=1, a decision is made to the last cell and a route labeled with "last cell" is selected (see a portion indicated by B in FIG. 19). If PT=0, a decision is made to other than the last cell and a route labeled with "other than last cell" is taken.

Furthermore, in a step W5, the start register is read to extract a head address at which the payload data of the incoming cell is written and a message number whereby the order of the message on that path is recognized. Then, in a step W6, a leading cell identifying bit in the message is checked to make a decision as to whether that cell is at the head or other than the head.

In the case of the leading cell, the YES route is selected so that, in a step W7, the setting to the message BOX/register which manages information in message unit is made with respect to a received cell. As the setting contents, a head address at which the message, when its turn comes, is stored on the basis of the status value of the message number read out in the step W5.

Still furthermore, in a step W8, a message number and a processing bit set into a non-processed condition are written as two-byte stored flag at the written head address of the receiving buffer memory (address written in the step W5). In this case, if already read out and not written, the processing bit is set to processing bit=0. If non-processed in readout, the processing bit is set to processing bit=1. Incidentally, if the decision in the step W6 shows other than the leading cell, the processing in the step W7 is not conducted but the NO route is taken so that the stored flag write processing is conducted in a step W8.

Following this, in a step W9, the payload data (48 bytes) of the received cell is written after the stored flag is written.

In a step W10, the address is incremented by one, and the stored flag readout processing bit is checked at the next address.

In a step W11, a check is made as to whether or not the readout processing bit has already been processed. This is because, in a case in which the received cell is written after the free area corresponding to that path is once occupied, the stored flag has already been written at the next address and the processing bit can assume 0 or 1. In the step W11, if the readout processing reaches completion, the NO route is taken so that the start register value is updated in a step W12. In addition, the message BOX register value is updated in a step W13, and the one-cell receive processing comes to an end in a step W14.

Incidentally, in the step W11, if the readout bit is not processed yet, the YES route is taken because there is a need to seek a free area in which the cell can be written.

Moreover, the frequency $S_n$ of examination is checked in a step W10c, and when the frequency $S_n$ examination assumes 0 to n−1, the processing again returns to the step W10 and the stored flag at the next address is checked. On the other hand, if the frequency $S_n$ of examination is at n, the right-hand route in FIG. 18 is taken so that, in a step W9z, a decision is made that the residual quantity of the memory area is insufficient.

Accordingly, when, after a case in which the readout processing bit indicates the non-processed condition continues, the number of times $S_n$ of examination is counted up to a maximum number of cells which can be written in the receiving buffer area ($S_n$=n), the receiving buffer area for that path does not have a free space in which the incoming cell can be written, and the notification of the insufficient residual quantity takes place.

In this connection, in a case in which the received cells of the first and second messages are written after the initialization of the receiving buffer area, since many free areas exist practically in the buffer area for that path, the stored flag is not written at the next address. Accordingly, no writing takes place at processing bit=0, and the start register is updated.

In addition, if the decision in the step W9z shows the insufficient residual quantity of the memory area, the set value of the message BOX register made in the step W7 is cleared in a step W10z, and in a step W11z, the current message is abandoned and the message write completion state immediately prior thereto is again taken. Still additionally, since the data of the received cell could be written without any trouble in the step W12, the head address in the start register is updated for writing the data of the next incoming received cell. Yet additionally, since the data of the received cell could be written without any trouble in the step W13, the cell count value of the message BOX/register is incremented.

Then, in the step W14, the write processing in the receiving buffer area in cell unit comes to an end. Furthermore, the processing again returns to the step W1 and a waiting state is taken for the next incoming ATM cell.

Figure 19:
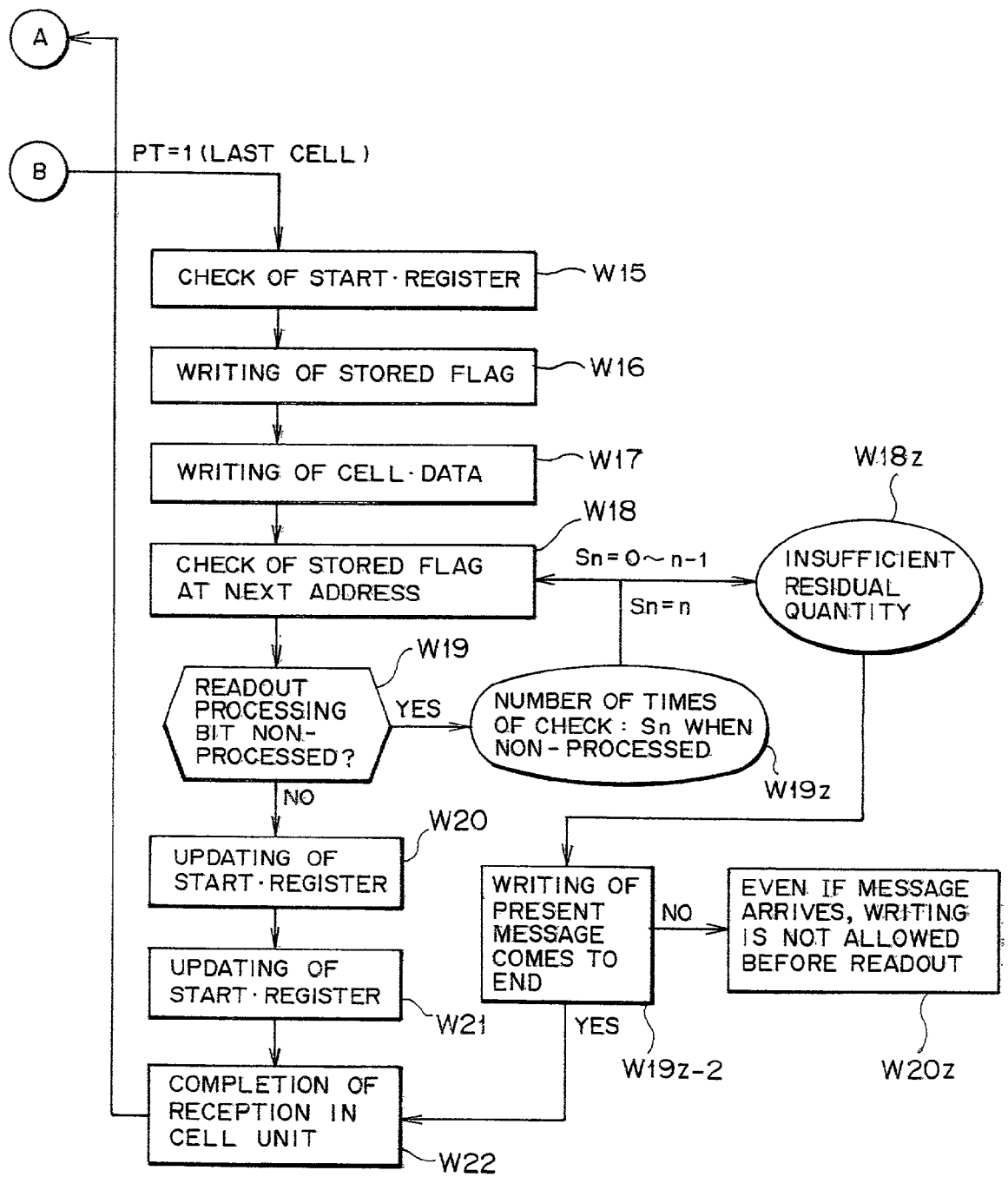
FIG. 19 is a flowchart showing receive processing using a stored flag, according to an embodiment of the present invention.

FIG. 19 is a flowchart showing receive processing using a stored flag, according to an embodiment of the present invention. The processing shown in FIG. 19 is a processing flowchart for writing of the last cell.

In FIG. 19, in a step W15, when a received cell is the last cell, a start register is read out, and as well as the step W5, a head address and a message number are taken in.

In a step W16, a message number value and a readout processing bit set into a non-processed condition are written as a two-byte stored flag at a write head address of the data, read out in the step W15, in the receiving buffer memory. That is, if the readout processing is completed and writing is not made, the processing bit=0, while if the readout processing is not conducted yet, the processing bit=1.

In addition, after the writing of the stored flag, the payload data (48 bytes) of a received cell is written in a step W17, and a readout processing bit in the stored flag at the next address is checked in a step W18. Still additionally, as in the case of the steps W10 and W11, if the processing bit=0, the processing advances to a step W20, while if the processing bit=1, the processing shifts to a step W19z.

In the step W19z, similarly, after a state in which the processing bit is non-processed continues, if the frequency $S_n$ of examination is counted up to a maximum number of cells which can be written in the receiving buffer area ($S_n$=n), the processing advances to a step W18z where it is considered that the receiving buffer area for that path has no free space for writing of an incoming cell, a notification of insufficient residual quantity takes place. Moreover, in a step W19z-2, the current message writing comes to an end, and thereafter, the NO route is taken until the readout is conducted, thus inhibiting the writing (step W20z). On the other hand, if the readout is conducted in the step W19z-2, the YES route is taken to lead the processing to a step W22.

Moreover, the data of the received cell is stored without any trouble in a step W19 and, hence, the head address in the start register for writing of the data of the next incoming received cell is updated in a step W20. Still moreover, the data of the received cell is written without any trouble in a step W21 and, hence, the cell count value of the message BOX/register is incremented and the leading cell identifying bit in the message is set up.

Accordingly, in a step W22, the write processing in the receiving buffer area in message unit comes to an end. In addition, the processing again returns to the step W1 to fall into a waiting condition for the next incoming ATM cell.

Figure 20:
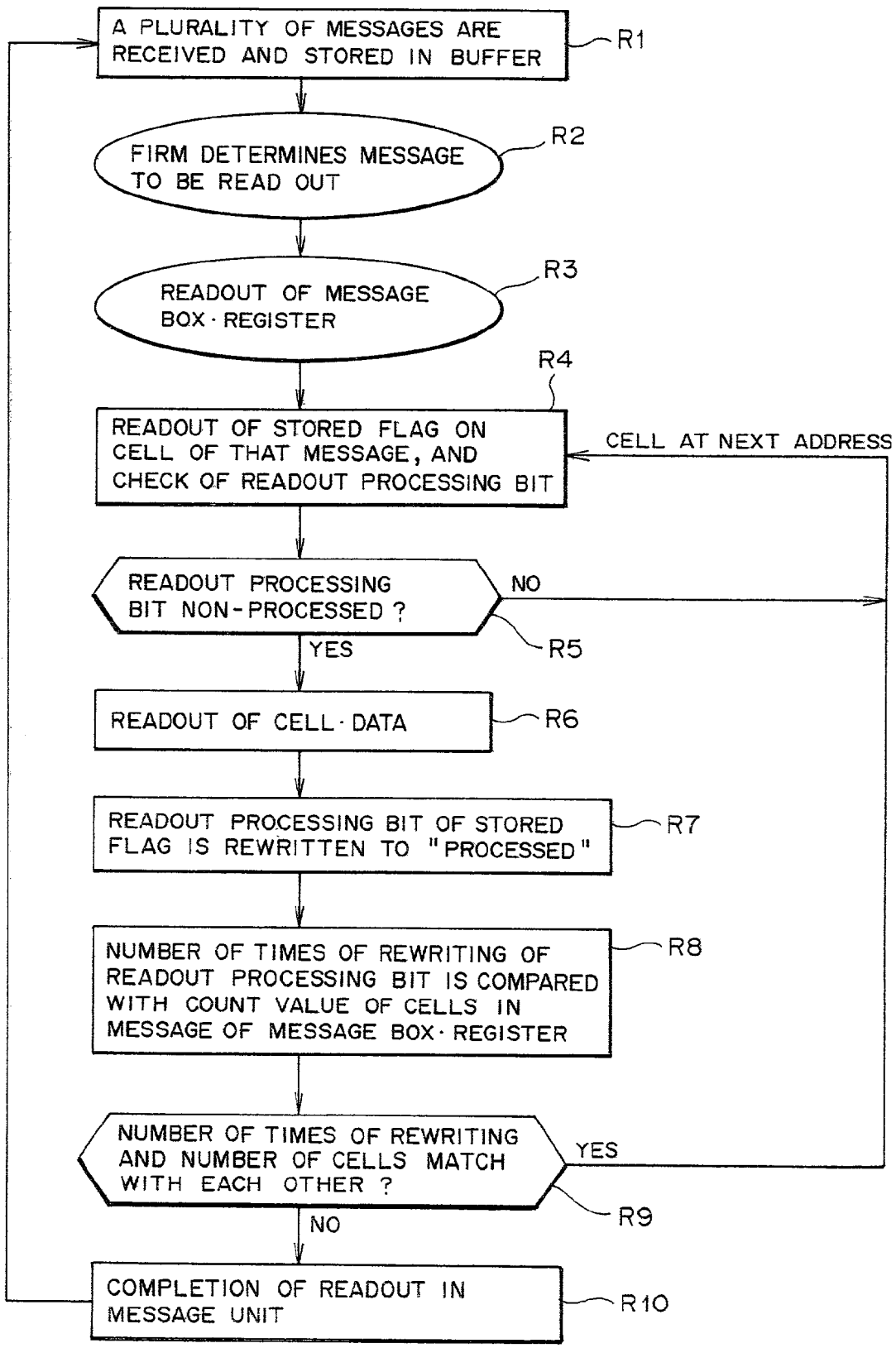
FIG. 20 is a flowchart showing receive processing using a stored flag, according to an embodiment of the present invention.
Figure 21:
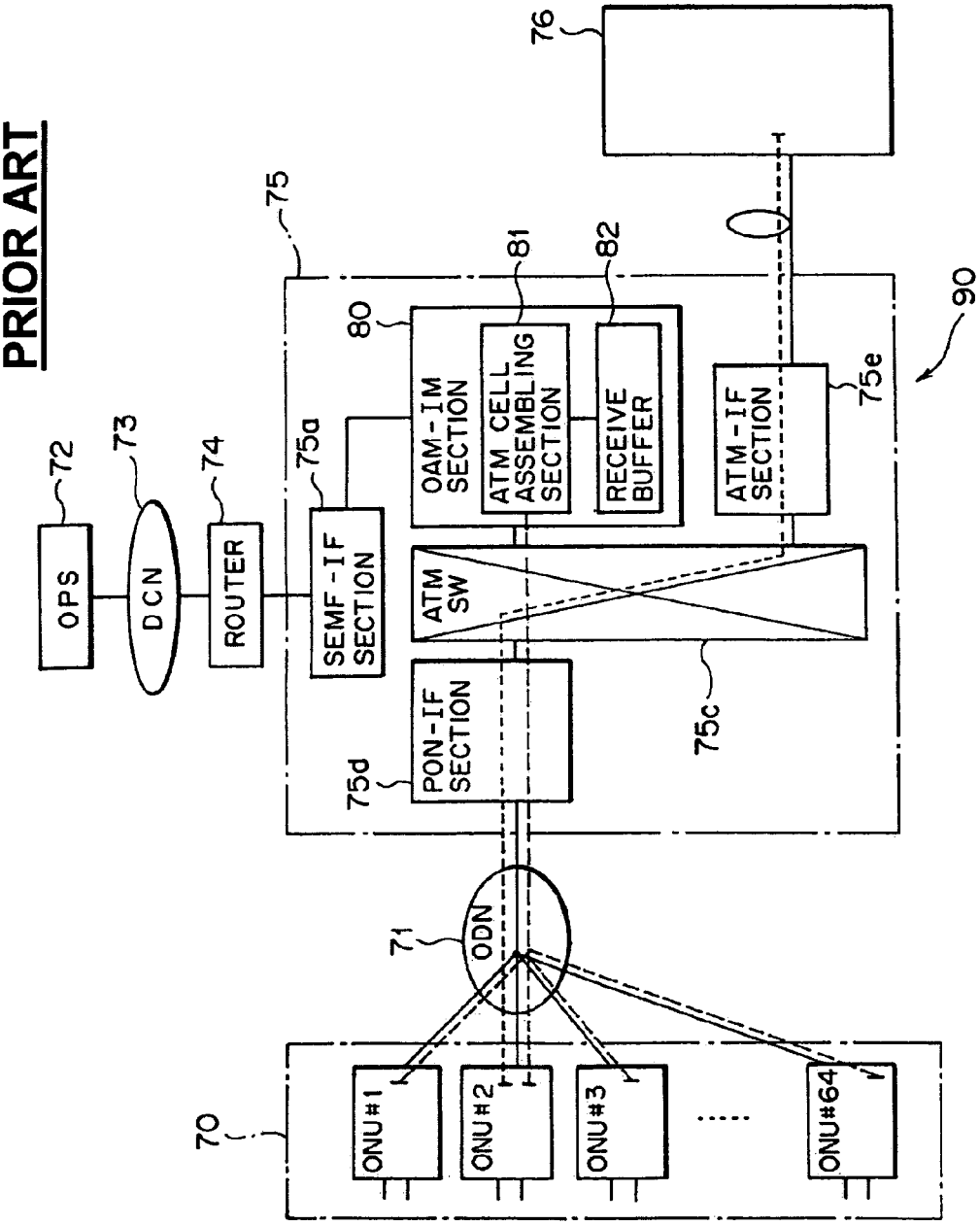
FIG. 21 is an illustrative view showing a configuration of an ATM-PON system.
Figure 22:
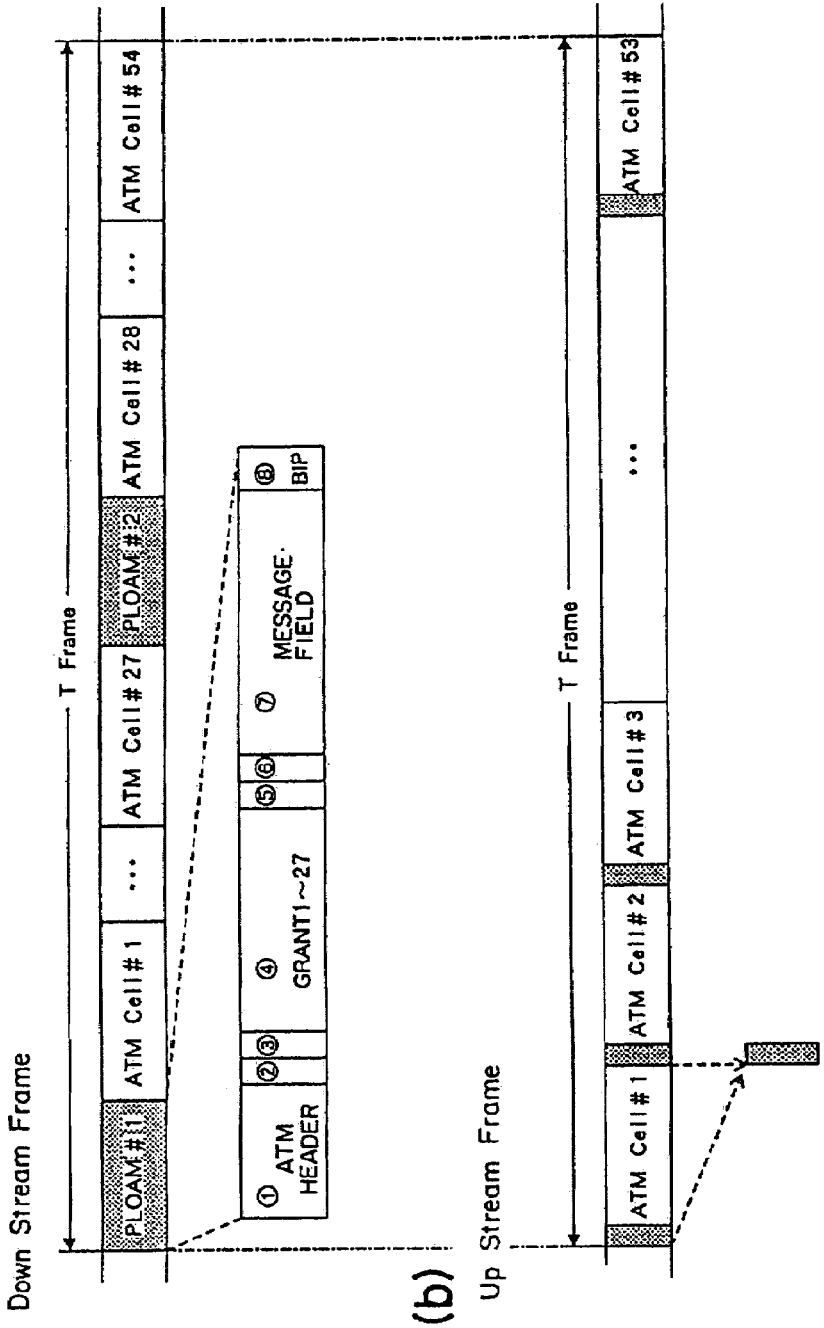
FIG. 22(a) is an illustration of a 150-Mbps down stream frame configuration.
FIG. 22(b) is an illustration of a 150-Mbps up stream frame configuration.
Figure 23:
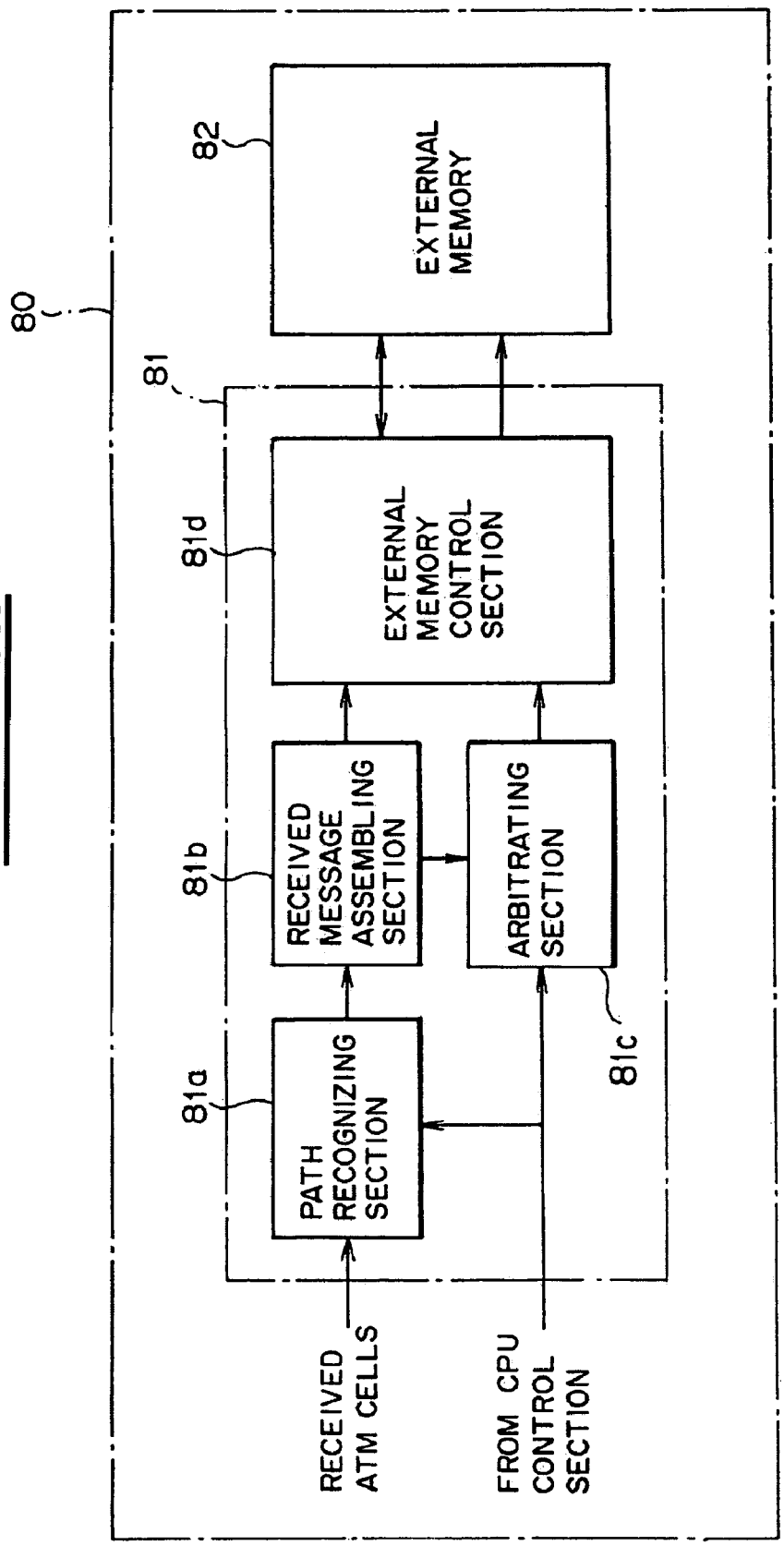
FIG. 23 is a block diagram showing a conventional OAM-IF section.
Figure 24:
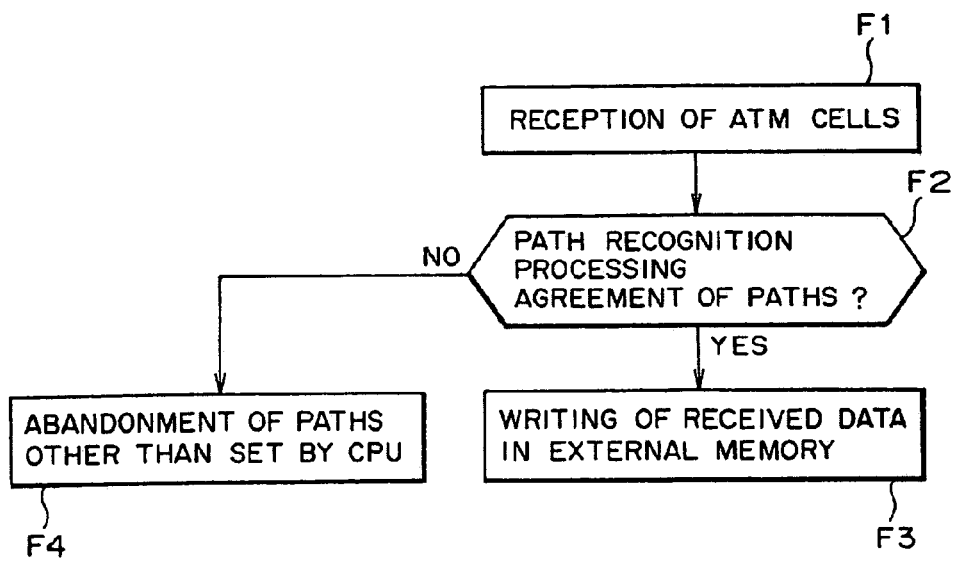
FIG. 24 is a flowchart showing conventional received cell assembling processing.
Figure 25:
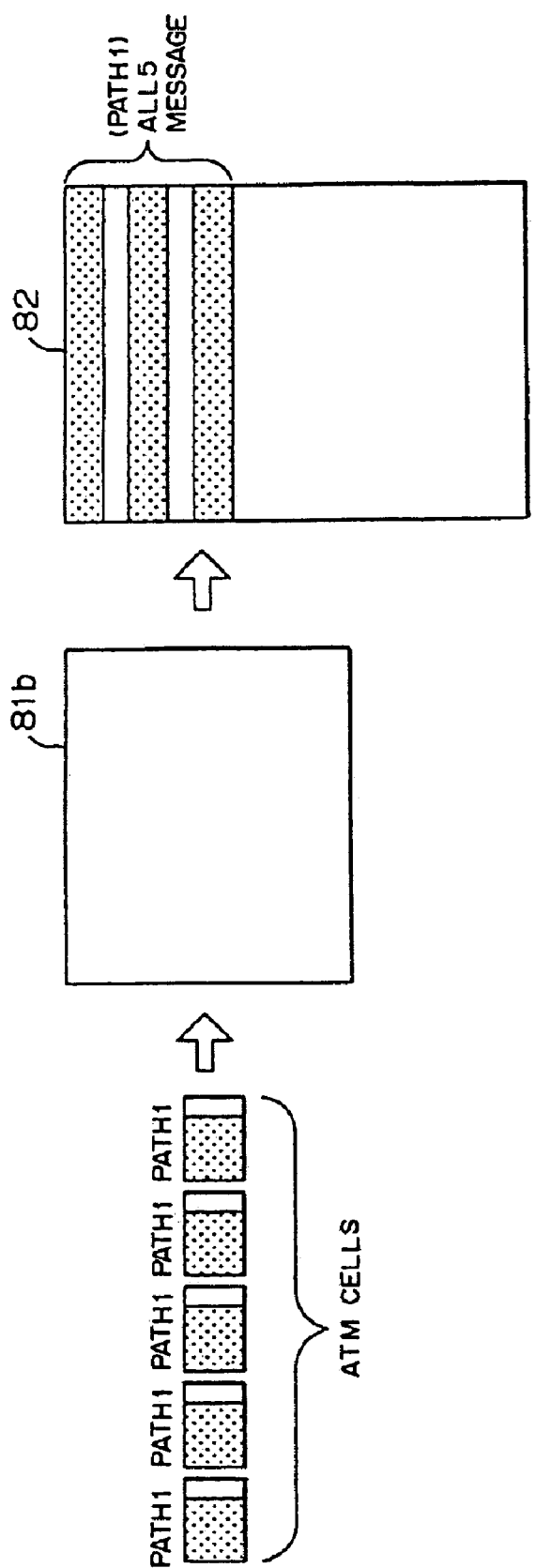
FIG. 25 is an illustrative view showing a flow from ATM cell reception to AAL5 message assembling.
Figure 26:
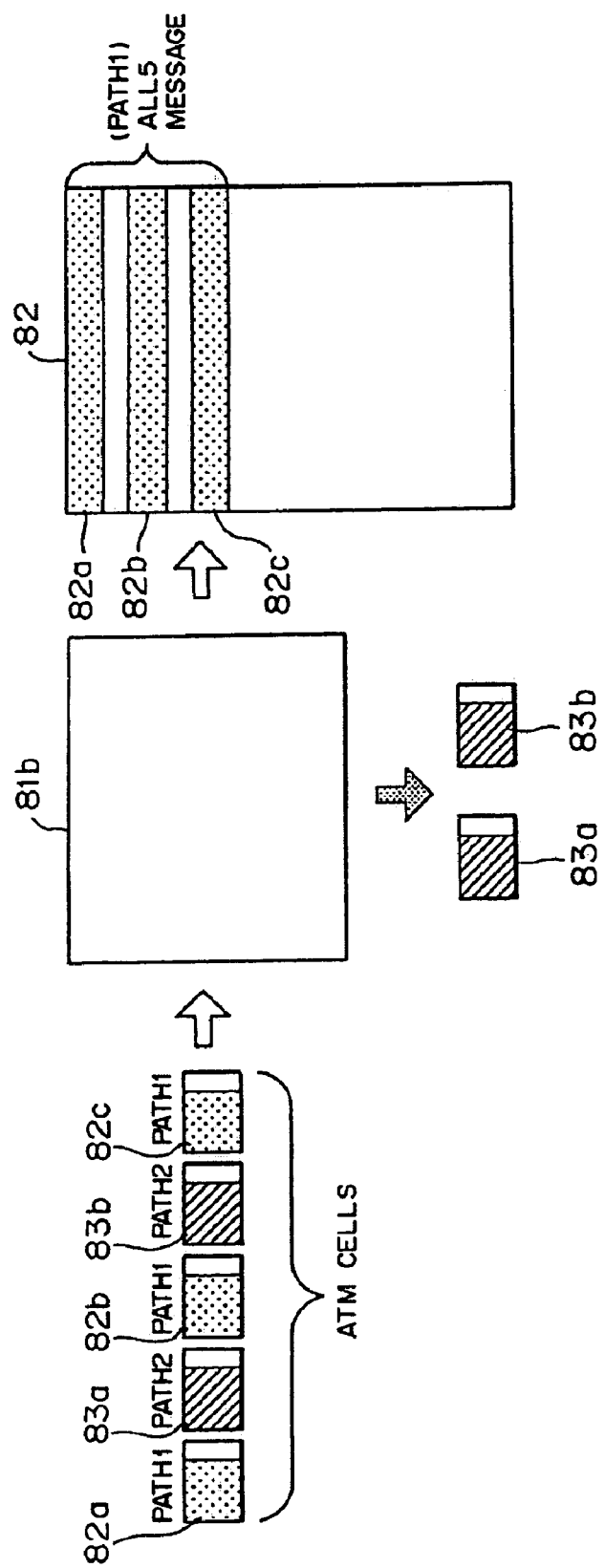
FIG. 26 is an illustrative view showing a flow to be taken for when, upon reception of an ATM cell, the received cell is abandoned.

FIG. 20 is a flowchart showing receive processing using a stored flag, according to an embodiment of the present invention. The processing shown in FIG. 20 is a readout processing flowchart for the last cell.

First of all, a plurality of messages are stored in a step R1. Then, in a step R2, after confirming that a plurality of AAL5 messages are stored in the receiving buffer area, the CPU (firmware) determines a message to be read out.

In a step R3, the message BOX register for the readout-determined message is read out and the head address at which that message is stored is fetched.

In a step R4, the message number is checked and the stored flag of the leading cell of that message is read out to examine the message number.

In a step R5, the readout processing bit is examined so that, when the readout processing bit=1, the non-processing route is taken, and in a step R6, the payload data (48 bytes) is read out intactly. Moreover, when the processing bit=0, the processing-completed route is taken so that the processing again returns to the step R4 for reading out the stored flag in which the next cell exists.

Since, in a step R7, the readout of the cell data at that address reaches completion, the readout processing bit in the stored flag of that cell is rewritten to the processing completion, i.e., the readout processing bit=0.

In a step R8, the number of times of rewriting of the readout processing bit is compared with the in-message cell count value in the message BOX register, and in a step R9, if they do not match with each other, the non-matching route is taken so that the processing again returns to the step R4 for reading out the stored flag existing in a portion storing the next cell. If the comparison result shows the matching, the matching route is taken so that, in a step R10, the readout in message unit comes to an end, and the processing again returns to the step R1 for the preparation for the readout of the next message.

At this time, since the area for the message read out becomes a free area, when the next cell is received, the data in this cell are made to be successively written therein.

When one cell is received in this way, with regard to that cell, a cell number, a message number, the number of received cells and others are managed through the use of the aforesaid plurality of management information; therefore, the efficient use of the memory area becomes feasible and the transfer of the AAL5 message from a plurality of paths becomes possible, which enables the improvement of the transfer processing capability in total and the realization of a shortening of the data transfer time.

In addition, since the cell writing in the receiving buffer memory becomes dynamic, the effective use of the memory area becomes feasible and the PCB parts mounting area becomes reducible, which leads to promoting the reduction of the cost of the PCB.

Still additionally, the multi-connections (see FIG. 1) become possible in this way. That is, it is possible to time-division-multiplex the data from the ordinary users, which allows the transfer of a large volume of data.

(B) Others

In the above-described embodiments, although the writing ranks are added in the order of the cell arrival, as the method of switching this arrival order into the writing ranks using a stored flag, there are various methods. For example, it is realizable in a manner that an area for the setting is placed in the assembling work areas $K_1$ and $K_2$ shown in FIG. 4. In addition, the address table 23, the message BOX 24 and each of the areas of the receiving buffer area are not limited to the partitioning shown in FIG. 4, but it is also possible that the respective areas are allocated to separate storage units. Still additionally, the locations of the stored flags in the memory area can be set diversely.

Moreover, in the aforesaid message writing apparatus, the message is a message of the adaptation layer and the cells are divisions of a message of the adaptation layer, with this adaptation layer being AAL5. Similarly, in the message readout apparatus, the message is a message of the adaptation layer and the cells are divisions of a message of the adaptation layer, with this adaptation layer being AAL5.

Incidentally, the adaptation layer to which the present invention is applicable is not limited to the AAL5, but AAL0, AAL1, AAL2 and AAL3/4 can also be put to use.

Still moreover, in FIG. 6, the external memory control section 21e and the CPU 25 are connected as in the case of FIG. 5 (not shown). In addition, in FIG. 7, the message BOX 24 is shown outside the external memory 22 for explanation only.

INDUSTRIAL APPLICABILITY

Currently, due to the spread of the internet and others, the data transfer volume in networks has been on the extreme increase, also in the case of a communication apparatus based on an ATM network, there is a need to conduct the quick and accurate transfer processing of a large volume of data; therefore, the multi-connections in the ATM path unit has been essential. According to the present invention, since the transfer of the AAL5 message from a plurality of paths is possible in a manner a received ATM cell is written in a receiving buffer by each path, the transfer processing ability is improvable in total and the shortening of the data transfer time is realizable.

In addition, since the AAL5 message assembling section is made to have the extension performance in specification and capacity of the accompanying receiving buffer memory, it is possible to construct an optimum communication apparatus system having a processing capability according to the traffic of a network.

Still additionally, since the cell writing in the receiving buffer memory is made dynamically, the effective use of the memory area is feasible and the PCB parts mounting area is reducible, which leads to the further reduction of the PCB cost.

The invention claimed is:

1. A message writing apparatus characterized by comprising:
receiving means (21b) for receiving cells having path information, said cells being obtained by division of a variable-length message;
message area allocating means (21e) for extracting said path information from the received cells received by said receiving means (21b) to allocate a memory area (22) corresponding to said path information, said memory area (22) being larger than a size of said variable-length message;
writing ranking adding means (21c) for adding writing ranks to the received cells when the received cells are written in said memory area (22) allocated by said message area allocating means (21e); and
storing means (25) for writing the received cells in said memory area (22) according to said writing ranks added by said writing rank adding means (21c), characterized in that said message area allocating means (21e) includes:
address table setting means for setting, in said memory area (22), an address table area (23) in which a size of a writing area, a writing position of said variable-length message and the number of received cells, corresponding to said path information, are related to each other on the basis of cell numbers and message number of the received cells; and
message storing area setting means for setting, in said memory area (22), a message storing area (24) which CPU reads out the received cells in message units.

2. A message writing apparatus according to claim 1, characterized in that said writing rank adding means (21c) is made to add said writing ranks to said received cells in the order of receiving processing of the received cells.

3. A message writing apparatus according to claim 1, characterized in that said message is an adaptation layer message and said cells are obtained by division of said adaptation layer message.

4. A message writing apparatus according to claim 3, characterized in that said adaptation layer is based on AAL5.

5. A message writing apparatus characterized by comprising:
receiving means (21b) for receiving cells having path information, said cells being obtained by division of a variable-length message;
message area allocating means (21e) for extracting said path information from the received cells received by said receiving means (21b) to allocate a memory area (22) corresponding to said path information, said memory area (22) being larger than a size of said variable-length message;
writing ranking adding means (21c) for adding writing ranks to the received cells when the received cells are written in said memory area (22) allocated by said message area allocating means (21e); and
storing means (25) for writing the received cells in said memory area (22) according to said writing ranks added by said writing rank adding means (21c), characterized in that said writing rank adding means (21c) is made to add said writing ranks to said received cells by writing flag information indicative of whether or not the received cells are read out, in flag areas (K1, ..., Ka) placed in said memory area (22).

6. A message writing apparatus according to claim 5, characterized in that said writing rank adding means (2c) is equipped with residual quantity examining means ($K_{2-1}, \ldots, K_{2-n}$) for checking said flag information to examine a size of a free area for writing of the received cells.

7. A message writing apparatus characterized by comprising:
receiving means (21b) for receiving cells having path information, said cells being obtained by division of a variable-length message;
message area allocating means (21e) for extracting said path information from the received cells received by said receiving means (21b) to allocate a memory area (22) corresponding to said path information, said memory area (22) being larger than a size of said variable-length message;
writing ranking adding means (21c) for adding writings ranks to the received cells when the received cells are written in said memory area (22) allocated by said message area allocating means (21e); and
storing means (25) for writing the received cells in said memory area (22) according to said writing ranks added by said writing rank adding means (21c), characterized in that said writing rank adding means (21c) is made to add said writing ranks by reading out an indication of a head address holding section (40a, 40b) which manages writing positions for writing of the received cells in said memory area (22) and an indication of a message storing/holding section (41a, 41b, 41c) which manages a message number of the written received cells and writing position information.

8. A message writing apparatus according to claim 7, characterized in that said writing rank adding means (21c) is equipped with residual quantity checking means ($K_{2-1}, \ldots, K_{2-n}$) for examining a size of a free area far writing of the received cells by checking the indication of said head address holding section (40a, 40b) and the indication of said message storing/holding section (41a, 41b, 4c).

9. A message writing method characterized by comprising:
a receiving step of receiving cells having path information, said cells being obtained by division of a variable-length message;
a message area allocating step of extracting said path information from the received cells received in said receiving step to allocate a memory area (22) corresponding to said path information, said memory area (22) being larger than a size of said variable-length message;
a writing rank adding step of adding writing ranks to the received cells when the received cells are written in said memory area (22) allocated in said message area allocating step; and
a storing step of writing the received cells in said memory area (22) according to said writing ranks added in said writing rank step, characterized in that said message area allocating step includes:
an address table setting step of setting, in said memory area (22), an address table area (23) in which a size of a writing area, a writing position of said variable-length message and the number of received cells, corresponding to said path information, are related to each other on the basis of cell numbers and message number of the received cells; and a message storing area setting step of setting, in said memory area (22), a message storing area (24) which CPU reads out the received cells in message units.

10. A message readout apparatus (20) which reads out each of a plurality of cells constituting a message and written in a memory area (22), characterized by comprising:

first means (22, 25) for reading out said message in accordance with writing ranks added in the order of receive processing of said cells;

second means (22, 25) for reading out said message on the basis of the added writing ranks in a manner that flag information, indicative of whether or not said cells are read out, is written in said memory area (22);

third means (22, 25) for reading out said message on the basis of said writing ranks based on an indication of a message storing/holding section (41a, 41b, 41c) which manages a message number of the received cells written in said memory area and writing position information thereon; and control means (23) operable for selecting any one of said first means (22, 25), said second means (22, 25) and said third means (22, 25) by setting of said memory area (22).

11. A message readout apparatus according to claim 10, characterized in that said message is an adaptation layer message and said cells, said cells being obtained by division of said adaptation layer message.

12. A message readout apparatus according to claim 11, characterized in that said adaptation layer is based on AAL5.

13. A message readout method of reading out each of a plurality of cells constituting a message and written in a memory area (22), characterized by comprising:

a first step of reading out said message in accordance with writing ranks added in the order of receive processing of said cells;

a second step of reading out said message on the basis of the added writing ranks in a maimer that flag information, indicative of whether or not the cells are read out, is written in said memory area (22); and a third step of reading our said message in accordance with said writing ranks provided by an indication of a message storing/holding section (41a, 41b, 41c) which manages a message number of the received cells written in said memory area (22) and writing position information, with one of said first step, said second step and said third step being selectively implemented according to setting of said memory area (22).

14. A memory address control circuit for writing of a variable-length message, characterized by comprising:

a path recognizing section (21a) for receiving cells, said cells being obtained by division said variable-length message and transmitted to extract path information from the received cells;

a receive control section (21c) operable for adding wilting ranks on writing in a memory (22) in correspondence with said path information outputted from said path recognizing section (21a) and for outputting a size of a writing area, a writing position of said variable-length message, and the number of received cells as management information;

a received message assembling section (21b) having an address table (23), in which said size of said writing area, said writing position of said variable-length message, and the number of received cells, corresponding to said path information, are related to each other on the basis of said management information from said receive control section and operable for assembling the received cells with respect to one variable-length message and outputting second write information; and a memory control section (21e) operable for controlling writing in said memory (22) on the basis of said management information from said received message assembling section (21b) and the second write information from the receive control section (21c).

15. A memory address control circuit for readout of a variable-length message, characterized by comprising:

a path recognizing section (21a) for receiving cells, said cells being obtained by division of said variable-length message and transmitted to extract path information from the received cells;

a receive control section (21c) operable for adding writing ranks on readout from a memory (22) in correspondence wit said pat information outputted from said pat recognizing section (21a) and for outputting a size of a readout area, a readout position of said variable-length message, and the number of received cells as management information;

a received message assembling section (21b) having an address table (23), in which said size of said readout area, said readout position of said variable-length message and the number of received cells being corresponding to said pat information, are related to each other on the basis of said management information from said receive control section (21c) and operable for assembling the received cells with respect to one variable-length message to output and outputting second readout information; and a memory control section (21e) operable for controlling the readout to said memory (22) on the basis of said management information from said received message assembling section (21b) and said second readout information from said receive control section.

* * * * *